(12) United States Patent
Dong et al.

(10) Patent No.: US 12,170,386 B2
(45) Date of Patent: Dec. 17, 2024

(54) BATTERY PACK AND COMBINATION OF A POWER TOOL AND THE BATTERY PACK

(71) Applicant: Nanjing Chervon Industry Co., Ltd., Nanjing (CN)

(72) Inventors: Zhijun Dong, Nanjing (CN); Jianan Liu, Nanjing (CN); Zhongquan Xu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 421 days.

(21) Appl. No.: 17/551,597

(22) Filed: Dec. 15, 2021

(65) Prior Publication Data

US 2022/0109217 A1    Apr. 7, 2022

Related U.S. Application Data

(63) Continuation of application No. PCT/CN2019/111827, filed on Oct. 18, 2019.

(51) Int. Cl.
*H01M 50/54* (2021.01)
*H01M 10/44* (2006.01)
(Continued)

(52) U.S. Cl.
CPC ......... *H01M 50/54* (2021.01); *H01M 10/443* (2013.01); *H01M 10/48* (2013.01); *H01M 50/209* (2021.01); *H01M 2220/10* (2013.01)

(58) Field of Classification Search
CPC .. H01M 50/54; H01M 50/533; H01M 50/534; H01M 50/209; H01M 50/213;
(Continued)

(56) References Cited

U.S. PATENT DOCUMENTS 11,165,209 B2*   11/2021   Lin .......................... B25F 5/02
2014/0248519 A1*  9/2014   Nishikawa ............ H01M 50/24
                                                  429/99
(Continued)

FOREIGN PATENT DOCUMENTS

CN          103460471 A      12/2013
CN          104157922 A      11/2014
(Continued)

OTHER PUBLICATIONS

EPO, extended European search report issued on European patent application No. 19933491.3, dated Feb. 3, 2023, 6 pages.
(Continued)

*Primary Examiner* — Raymond Alejandro
(74) *Attorney, Agent, or Firm* — Greenberg Traurig, LLP

(57) ABSTRACT

A battery pack includes a housing, a cell assembly, a cell support member, a first sensor, and a second sensor. The cell assembly is disposed in the housing; and the cell support member is at least configured to support the cell assembly. The cell assembly includes a plurality of cells which are sheet-shaped, the plurality of cells are stacked, and a cell among the plurality of cells includes an encapsulation member configured to encapsulate the cell and a tab disposed at at least one end of the cell assembly and protruding from the cell. The first sensor is configured to detect a temperature of the cell and is disposed on a side of the tab facing towards the cell support member. The second sensor is configured to detect a parameter related to leakage of the cell and is disposed in the cell assembly.

20 Claims, 16 Drawing Sheets

(51) Int. Cl.
*H01M 10/48* (2006.01)
*H01M 50/209* (2021.01)

(58) Field of Classification Search
CPC .. H01M 10/443; H01M 10/441; H01M 10/48; H01M 10/482; H01M 2220/10
See application file for complete search history.

(56) References Cited

U.S. PATENT DOCUMENTS

| | | | |
|---|---|---|---|
| 2015/0249237 A1* | 9/2015 | Naito | H01R 12/58 429/7 |
| 2015/0380697 A1 | 12/2015 | Osborne et al. | |

FOREIGN PATENT DOCUMENTS

| | | |
|---|---|---|
| CN | 105359328 A | 2/2016 |
| CN | 205452462 U | 8/2016 |
| CN | 106450098 A | 2/2017 |
| CN | 206412397 U | 8/2017 |
| CN | 102484232 A | 9/2017 |
| CN | 109428024 A | 3/2019 |
| CN | 106469797 A | 6/2021 |
| DE | 102013015781 A1 | 3/2015 |
| JP | 2019021594 A | 2/2019 |
| KR | 20110108010 A | 10/2011 |
| KR | 101229411 B1 | 2/2013 |
| WO | 2014128841 A1 | 8/2014 |
| WO | 2017113352 W | 7/2017 |

OTHER PUBLICATIONS

ISA/CN, International Search Report issued on PCT application No. PCT/CN2019/111827, dated Mar. 23, 2020, 3 pages.
ISA/CN, English translation of International Search Report issued on PCT application No. PCT/CN2019/111827, dated Mar. 23, 2020, 2 pages.
CIPO, office action issued on Canadian patent application No. 3,144,100, dated Nov. 16, 2022, 5 pages.
Office Action from Canadian application No. 3,144,100, dated Aug. 18, 2023, 3 pp.

* cited by examiner

BATTERY PACK AND COMBINATION OF A POWER TOOL AND THE BATTERY PACK

RELATED APPLICATION INFORMATION

This application is a continuation of International Application Number PCT/CN2019/111827, filed on Oct. 18, 2019, through which this application also claims the benefit under 35 U.S.C. § 119(a) of Chinese Patent Application No. CN 201910534991.4, filed on Jun. 20, 2019, and Chinese Patent Application No. CN 201910829581.2, filed on Sep. 3, 2019, all of which are incorporated herein by reference in their entirety.

TECHNICAL FIELD

The present application relates to the technical field of batteries, for example, a battery pack and a combination of a power tool and the battery pack.

BACKGROUND

Battery packs are used as power sources for more and more power tools based on the need for portability.

In the related art, a battery pack for supplying electricity to a power tool mostly uses cylindrical lithium cells. A plurality of cylindrical lithium cells are connected in series and in parallel to ensure a sufficient electrical energy output so as to improve endurance of the power tool.

On the one hand, the cylindrical lithium cell generally uses a rigid metal as a housing, which results in a large mass of the whole battery pack. A user needs to overcome relatively strong gravity to operate a machine when using the battery pack, affecting user experience.

From 2009 to 2013, TTI provided a rechargeable lithium battery pack for a power tool in patent publications such as U.S. Pat. Nos. 7,554,290, 7,557,535, 7,944,173, 7,999,510, 8,207,702, 8,269,459, and 8,450,971. The lithium battery pack can generate an average charging current higher than or equal to 20 amps, and such a battery pack can be repeatedly used by being charged so that the following problem is solved: disposable battery packs of power tools need to be frequently replaced and the same battery pack cannot be repeatedly used in the industry. Moreover, merely one battery pack was enough to supply matching output power required by the power tool in the industry at that time.

With the development of the power tool industry, power tools increasingly need power supply devices which can provide at least one of endurance or a high-power output of electrical energy. From 2014 to 2015, Makita provided two rechargeable lithium battery packs for different power tools in patent publications such as WO2014119175A1, WO2014119174A1, WO2014119188A1, and WO2015156170A1. The two rechargeable lithium battery packs can be connected to each other in parallel or in series to improve the endurance or output power of the battery packs. However, though a product using the two rechargeable lithium battery packs solves the problem about the output power or endurance, it will be very cumbersome for the user to operate a power tool using the two rechargeable lithium battery packs. In addition, the user has a poor operation experience and is easy to get tired when operating the power tool for a long time.

On the other hand, the cylindrical lithium cell in a low-temperature environment has the defect that an electrical energy output is affected due to too low an ambient temperature. Therefore, a power tool using the battery pack in the related art has greatly reduced performance when used in the low-temperature environment.

SUMMARY

In one example, the battery pack includes a housing, a cell assembly, a cell support member, a first sensor, and a second sensor. The cell assembly is disposed in the housing; and the cell support member is at least configured to support the cell assembly. The cell assembly includes a plurality of cells which are sheet-shaped, the plurality of cells are stacked, and a cell among the plurality of cells includes an encapsulation member configured to encapsulate the cell and a tab disposed at each of two ends of the cell assembly and protruding from the cell. The cell support member is disposed on opposite sides in a length direction of the cell assembly to encapsulate the tab. The cell assembly is configured to be capable of discharging at a rate higher than or equal to 5 C at an ambient temperature T, where $-22°$ C.$\leq$T$\leq-15°$ C., and 5 C represents a current intensity when a battery completely discharges for ⅕ hours, and the cell assembly has a gravimetric energy density higher than or equal to 300 wh/kg. The first sensor is configured to detect a temperature of the cell and disposed on a side of the tab facing towards the cell support member. The second sensor is configured to detect a parameter related to leakage of the cell and disposed in the cell assembly.

In one example, a battery pack includes a housing, a cell assembly, and a cell support member. The cell assembly is disposed in the housing; and the cell support member is at least configured to support the cell assembly. The cell assembly includes a plurality of cells which are sheet-shaped, the plurality of cells are stacked, and a cell among the plurality of cells includes an encapsulation member configured to encapsulate the cell and a tab disposed at each of two ends of the cell assembly and protruding from the cell. The cell support member is disposed at the two ends of the cell assembly, and at least part of the cell support member encapsulates the tab. The cell assembly is configured to be capable of discharging at a rate of 5 C at an ambient temperature T, where $-22°$ C.$\leq$T$\leq-15°$ C., and 5 C represents a current intensity when a battery completely discharges for ⅕ hours, and the cell assembly has a gravimetric energy density higher than or equal to 300 wh/kg.

In one example, a combination includes a power tool and a battery pack. The power tool includes a tool body and a tool interface and a tool matching portion disposed on the tool body. The battery pack is provided with a battery pack interface and a battery pack coupling portion, where the battery pack interface is configured to be adapted to the tool interface so as to supply electricity to the power tool, and the battery pack coupling portion is detachably connected to the tool matching portion. The battery pack further includes a housing, a cell assembly, and a cell support member. The cell assembly is disposed in the housing; and the cell support member is at least configured to support the cell assembly. The cell support member is made of an elastic material with a compression ratio higher than or equal to 50%. The cell assembly includes a plurality of cells which are sheet-shaped, the plurality of cells are stacked, and a cell among the plurality of cells includes an encapsulation member configured to encapsulate the cell and a tab disposed at each of two ends of the cell assembly and protruding from the cell. The cell support member is disposed at the two ends of the cell assembly and at least part of the cell support member encapsulates the tab. The cell assembly is configured to be capable of discharging at a rate of 5 C at an ambient temperature T, where $-22° C. \leq T \leq -15° C.$, and 5 C represents a current intensity when a battery completely discharges for 1/5 hours.

In one example, a combination includes a power tool and a battery pack. The battery pack is connected to the power tool. The battery pack includes a housing, a cell assembly, and a cell support member group. The cell assembly is disposed in the housing. The cell assembly includes a plurality of cells which are sheet-shaped, the plurality of cells are stacked, and a cell among the plurality of cells includes an encapsulation member configured to encapsulate the cell and a tab disposed at at least one end of the cell assembly and protruding from the cell. The cell support member group includes at least one cell support member. The cell support member is configured to at least support the cell assembly. The cell support member is disposed at the at least one end of the cell assembly and at least part of the cell support member encapsulates the tab. The cell assembly is configured to be capable of discharging at a rate higher than or equal to 5 C at an ambient temperature T, where $-22° C. \leq T \leq -15° C.$, and 5 C represents a current intensity when a battery completely discharges for 1/5 hours.

DETAILED DESCRIPTION

Figure 1:
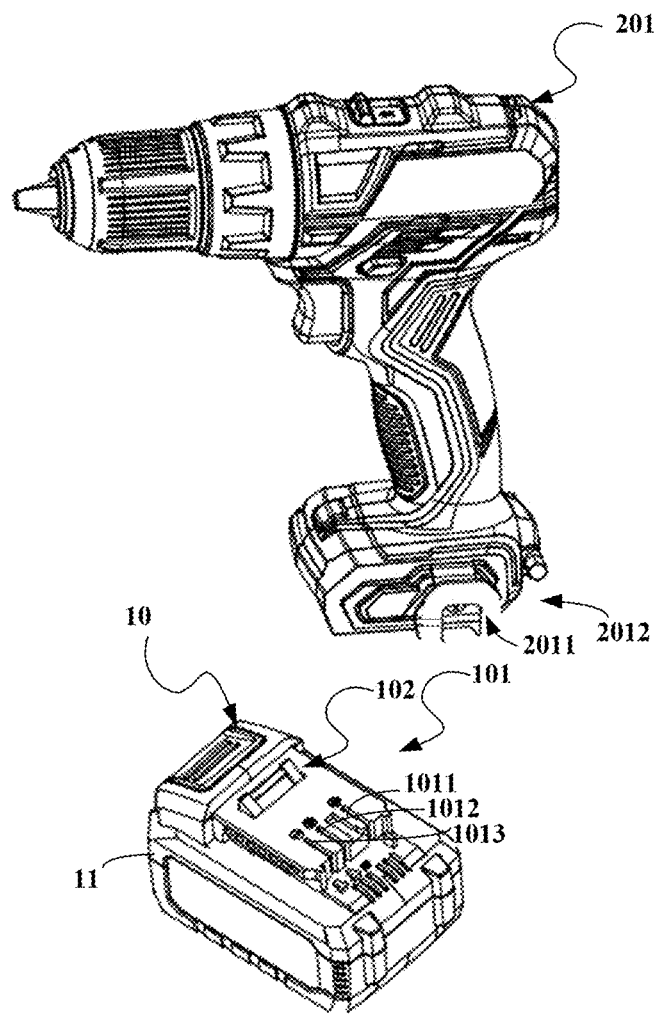
FIG. 1 is a schematic view illustrating a battery pack and power tools.
Figure 1:
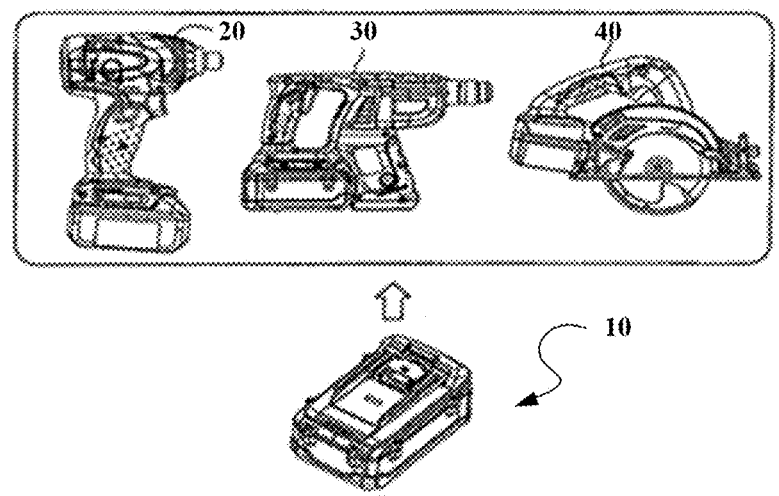

FIG. 1 illustrates a power tool 20 and a battery pack 10 which is applicable to the power tool 20 and supplies electricity to the power tool 20. A voltage of the battery pack 10 is typically 10.8 V, 24 V, 36 V, 48 V, 56 V, or 80 V, which is not limited herein. The battery pack 10 has a capacity higher than or equal to 2 Ah. In FIG. 1, the power tool 20 is an electric drill. Though an electric drill is involved in this example, it is to be understood that the present application is not limited to disclosed examples, and the battery pack is applicable to other types of power tools, including, but not limited to, a hammer 30, a sander 40, an angle grinder, the electric drill, an electric wrench, and an electric saw.

The power tool 20 includes a tool body 201 and a tool interface 2011 and a tool matching portion 2012 disposed on the tool body 201. The battery pack 10 is provided with a battery pack interface 101 and a battery pack coupling portion 102. The battery pack interface 101 is adapted to the tool interface 2011 so as to supply electricity to the power tool 20. The battery pack coupling portion 102 can be detachably connected to the tool matching portion 2012 so as to enable the battery pack 10 to supply electricity to the power tool 20.

In the following description, directions "up", "down", "front", and "back" are described using directions indicated by arrows in FIG. 2.

Referring to FIGS. 1 to 4, the battery pack 10 includes a housing 11, a circuit board 12, a cell assembly 13, and a cell support member 14.

The housing 11 includes an upper housing 111 and a lower housing 112. The upper housing 111 and the lower housing 112 are assembled to form an accommodating space for fixing and accommodating the cell assembly 13. The battery pack interface 101 is formed on one surface of the housing 11. The battery pack interface 101 includes a power supply positive interface 1011, a power supply negative interface 1012, and a power supply communication interface 1013 (referring to FIG. 1). The battery pack 10 supplies electrical energy to the power tool 20 through the power supply positive interface 1011 and the power supply negative interface 1012. The battery pack 10 communicates with the power tool 20 through the power supply communication interface 1013.

Figure 3:
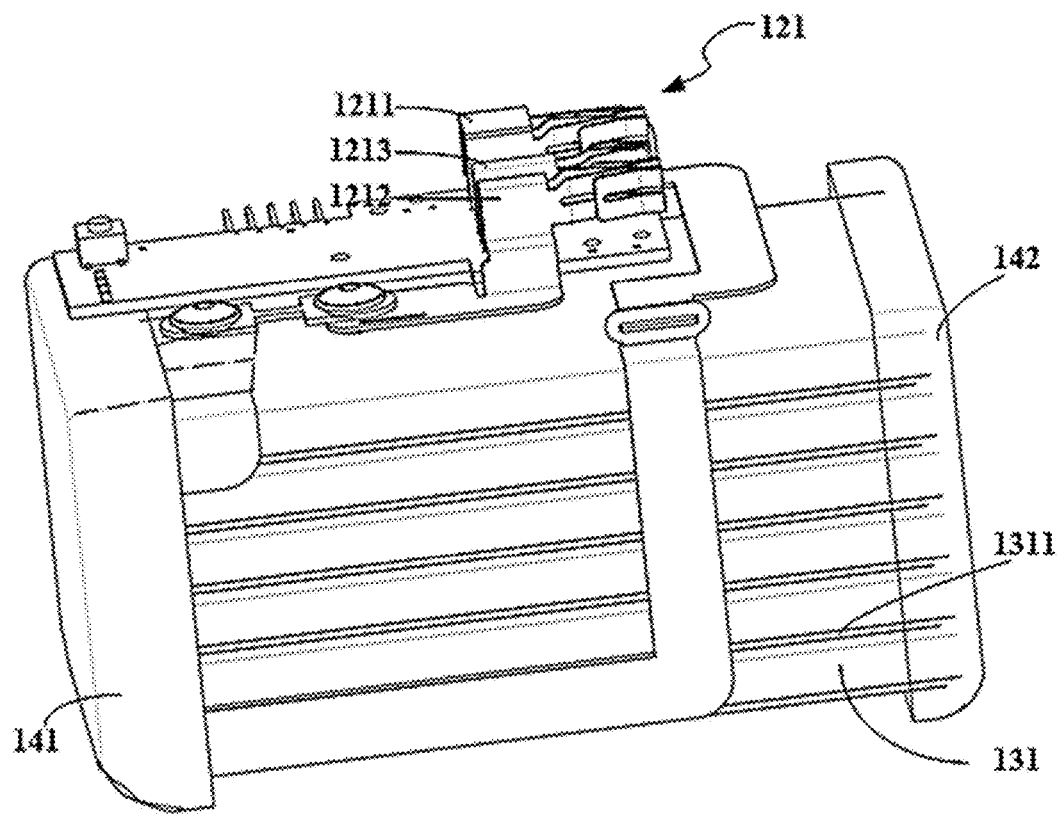
FIG. 3 is an internal structure view of the battery pack in FIG. 1 with a housing removed.

The cell assembly 13 is disposed in the accommodating space formed by the housing 11. As shown in FIG. 3, the cell assembly 13 includes one sheet-shaped cell 131 or a plurality of sheet-shaped cells 131. The plurality of sheet-shaped cells 131 are stacked. In some examples, the sheet-shaped cell 131 is a flat plate in shape, and the plurality of cells are sequentially stacked in an up-down direction. In other examples, the cell 131 may be bent into an arc shape. The cell 131 further includes an encapsulation member 1311 configured to encapsulate the cell 131 so as to prevent leakage of compounds in the cell 131. In one example, the encapsulation member 1311 may be, but not limited to, an aluminum plastic film.

Figure 4:
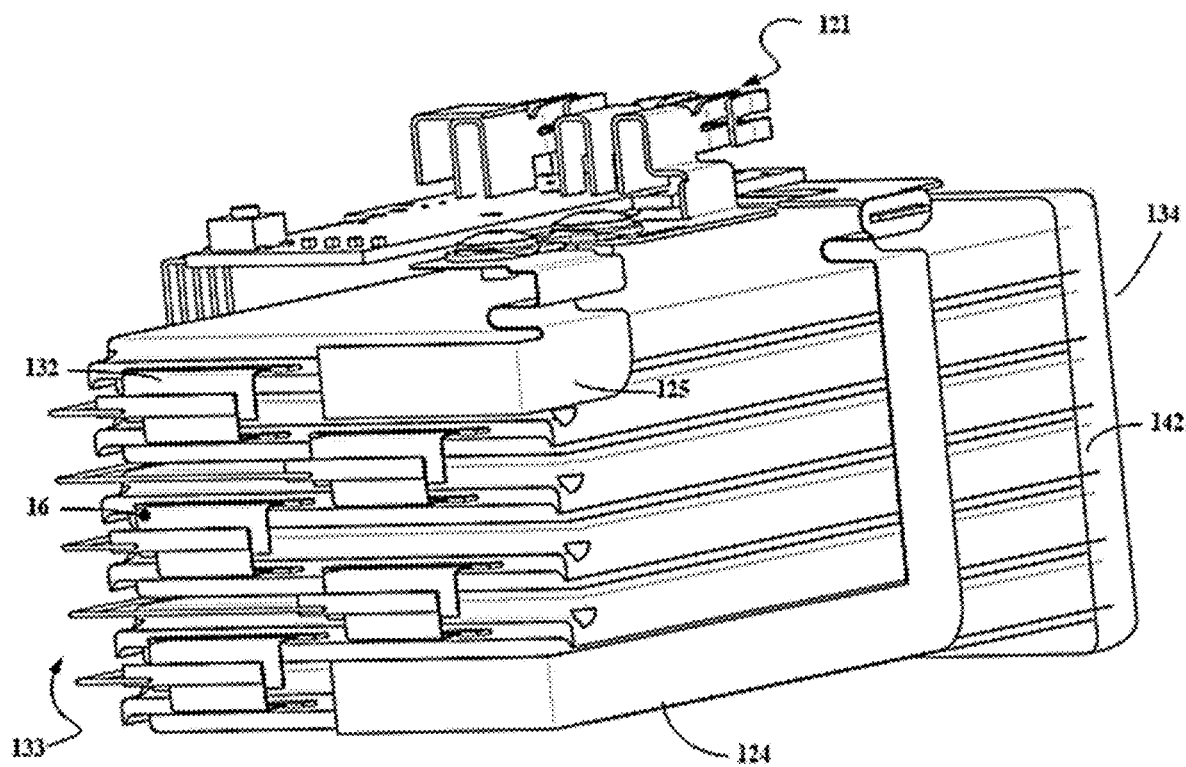
FIG. 4 is a structure view of the battery pack in FIG. 2 with a first support member removed.

As shown in FIG. 4, each cell 131 further includes a tab 132 disposed at at least one end of the cell assembly 13 and protruding from the cell 131. The cell assembly 13 has an upper surface and a lower surface, a first end surface and a second end surface between the upper surface and the lower surface, and a first side surface and a second side surface on two sides of the first end surface. The first end surface and the second end surface are opposite to each other. The tab 132 may be disposed on a left end surface 133 of the cell assembly 13 or on a right end surface 134 of the cell assembly 13. The first end surface 133 is the left end surface of the cell assembly 13, and the second end surface 134 is the right end surface of the cell assembly 13. It is also possible that some tabs 132 are distributed on the left end surface 133 of the cell assembly and other tabs are distributed on the right end surface 134. It is also possible that tabs 132 are distributed on at least one surface or several surfaces, which is not limited herein. In one example, a plurality of tabs 132 of the cells are mainly connected in series. In other examples, tabs 132 of the cells 131 may be connected in series and then connected in parallel to tabs 132 of other cells 131. In one example, the plurality of tabs 132 are connected to the circuit board 12 through cables, and the plurality of cells 131 are connected through related circuits of the circuit board 12. In other examples, the tabs 132 are connected to each other through connecting pieces or adapter plates.

The circuit board 12 is disposed between the upper housing 111 and the cell assembly 13, and the circuit board 12 is electrically connected to the cell assembly 13. The circuit board 12 includes a battery pack terminal 121 and a power management module. The power management module is configured to perform power management on the battery pack 10 to implement charging and discharging management of the battery pack 10. The battery pack terminal 121 is disposed in the battery pack interface 101 so as to output electrical energy of the battery pack 10. The battery pack terminal 121 includes a battery pack positive terminal 1211, a battery pack negative terminal 1212, and a battery pack communication terminal 1213 (referring to FIG. 3). The battery pack positive terminal 1211 is disposed in the power supply positive interface 1011, and the battery pack negative terminal 1212 is disposed in the power supply negative interface 1012, so as to supply electricity to the power tool 20 which is connected to the battery pack interface 101. The battery pack communication terminal 1213 is disposed in the power supply communication interface 1013 to communicate with the power tool 20 which is connected to the battery pack interface 101.

In one example, the battery pack terminal 121 and the tab 132 are connected to output the electrical energy of the battery pack 10, and the circuit board 12 is connected to a positive electrode and a negative electrode of the cell assembly 13 and a positive electrode and a negative electrode of the cell 131. Referring to FIG. 4, the tab 132 is disposed on the left end surface 133 of the cell assembly 13; the tab 132 is connected to a positive wire 124 and a negative wire 125. The electrical energy of the battery pack 10 is outputted to the power tool 20 through the tab 132, the positive wire 124, the negative wire 125, and the battery pack terminal 121. In other examples, the tab 132 is connected to the circuit board 12, and the electrical energy of the battery pack 10 is outputted to the power tool 20 through the tab 132, the circuit board 12, and the battery pack terminal 121. Spot welding, seam welding, or surface welding is used between the cell 131 and wires and between the cell 131 and other cells 131. In this example, ultrasonic welding or laser welding is used.

Figure 2:
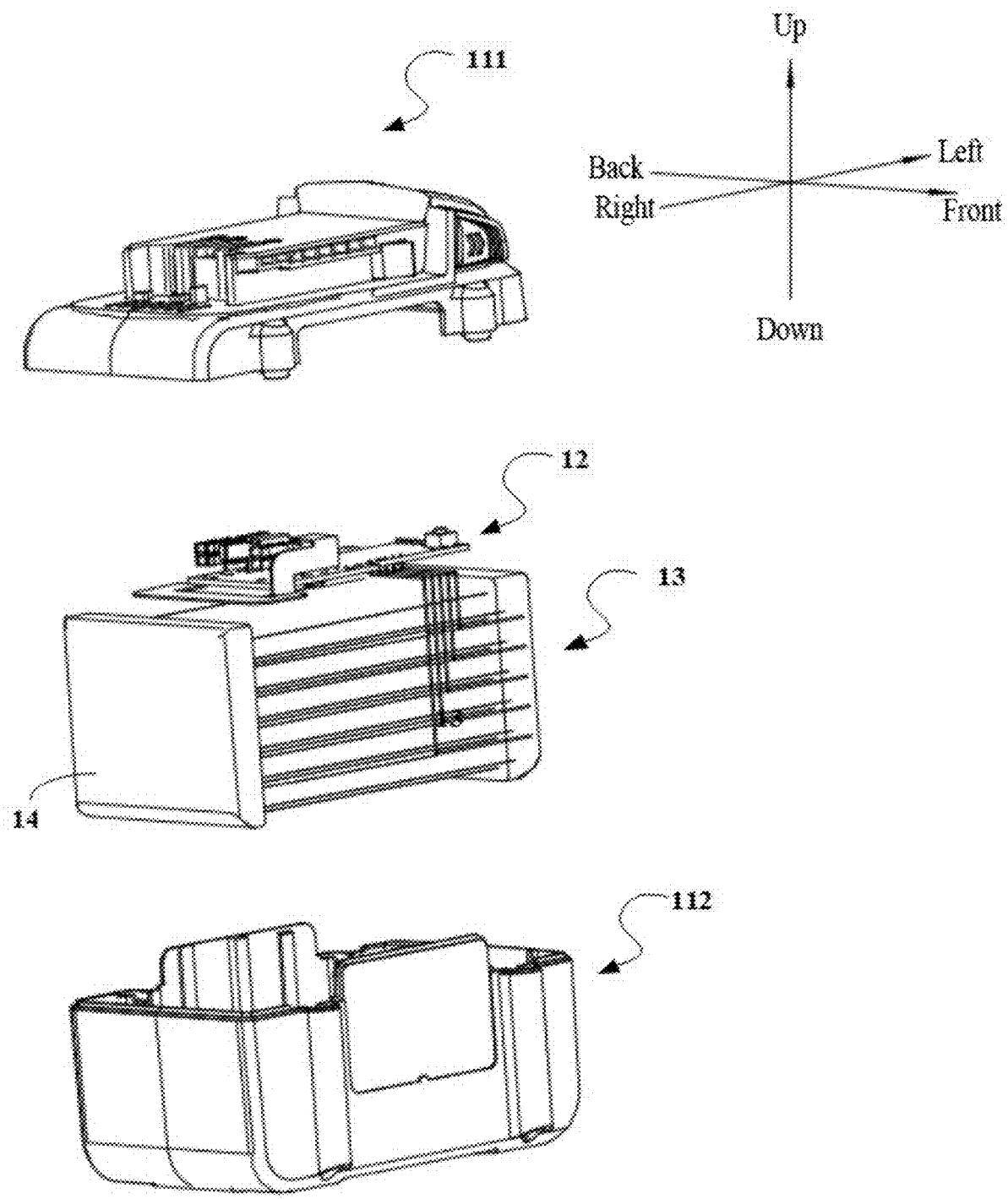
FIG. 2 is a structure view of a battery pack according to an example.

As shown in FIG. 2, the cell support member 14 is disposed at two ends of the cell assembly 13, and at least part of the cell support member 14 encapsulates the tab 132. In one example, as shown in FIG. 3, the cell support member 14 includes a first support member 141 and a second support member 142. The first support member 141 is disposed on the left end surface 133 of the cell assembly 13, and the left end surface 133 is the surface of the cell assembly 13 where the tab 132 is disposed. The second support member 142 is disposed on the right end surface 134 of the cell assembly 13, and the right end surface 134 and the left end surface 133 are opposite to each other. The cell support member 14 encloses and fixes the tab 132. The tab 132 quickly transmits internal heat of the cell 131 out, and the cell assembly 13 quickly transmits internal heat of the cell assembly 13 out through the plurality of tabs 132. Since the cell support member 14 has a preset thermal conductivity (where the thermal conductivity is higher than or equal to 0.6 W/m·k) and the cell support member 14 is configured to encapsulate the tab 132, the heat of the cell assembly 13 is quickly transmitted out through the cell support member 14 in contact with the tabs 132. Thus, a heat dissipation effect is enhanced.

In one example, the cell support member 14 may extend from the left end surface 133 and the right end surface 134 of the cell assembly 13 to the upper surface, the lower surface, the first side surface, and the second side surface of the cell assembly 13 until the cell assembly 13 is completely enclosed and fixed by the cell support member 14. In other examples, the cell support member 14 may enclose the left end surface 133, the right end surface 134, the upper surface, and the lower surface of the cell assembly 13, or the cell support member 14 may enclose the left end surface 133, the right end surface 134, the first side surface, and the second side surface of the cell assembly 13.

The cell support member 14 is formed at two opposite ends of the cell assembly 13 through glue injection. The cell assembly 13 is placed in a mold and the plurality of cells 131 are sequentially stacked from bottom to top in the mold. Glue is injected using the mold at the two opposite ends where the tabs 132 of the plurality of cells 131 are located so as to form the cell support member 14 on two sides of the plurality of cells 131. That is, the cell support member 14 is formed on the left end surface 133 and the right end surface 134 of the cell assembly 13 through the glue injection. Then, the cell assembly 13 and the formed cell support member 14 are taken out as a whole.

In one example, the cell support member 14 is formed on the whole outer surface of the cell assembly 13 through the glue injection. The cell assembly 13 is placed in the mold, and the cell support member 14 is formed on the whole outer surface of the cell assembly 13 through the glue injection. Then, the cell assembly 13 and the formed cell support member 14 are taken out as a whole.

The cell support member 14 is a solid-state insulating elastic member, and the cell support member 14 has a compression ratio higher than or equal to 50%. The cell support member is an elastic member having elongation at break higher than or equal to 100% and tensile strength higher than or equal to 0.9 N/mm$^2$. The cell support member 14 has thermal conductivity higher than or equal to 0.6 W/(m·k).

The cell support member 14 is configured to support the cell assembly 13 to prevent a relative displacement between the plurality of cells 131 due to bumping or shocks so that the plurality of cells 131 or the plurality of tabs 132 are prevented from being squeezed or kinked. Therefore, the cell support member 14 can improve the anti-dropping and shock absorption performance of the battery pack 10 and further improve reliability of the battery pack 10. In addition, the cell support member 14 is the elastic member and can better adapt to an expansion property of the battery pack 10. Furthermore, the cell support member 14 can also improve heat dissipation performance of the battery pack 10, which will be described below in detail in conjunction with an example.

In one example, for the battery pack 10 shown in FIG. 1, the cell assembly 13 has a gravimetric energy density within a range of 300 wh/kg to 3500 wh/kg. In one example, the cell assembly 13 has a gravimetric energy density within a range of 1000 wh/kg to 3500 wh/kg. In one example, the cell assembly 13 has a gravimetric energy density within a range of 2600 wh/kg to 3500 wh/kg. In one example, the cell assembly 13 has a gravimetric energy density within a range of 2600 wh/kg to 3000 wh/kg. In one example, the cell assembly 13 has a gravimetric energy density within a range of 300 wh/kg to 500 wh/kg. In one example, the cell assembly 13 has a gravimetric energy density within a range of 400 wh/kg to 600 wh/kg.

Figure 5:
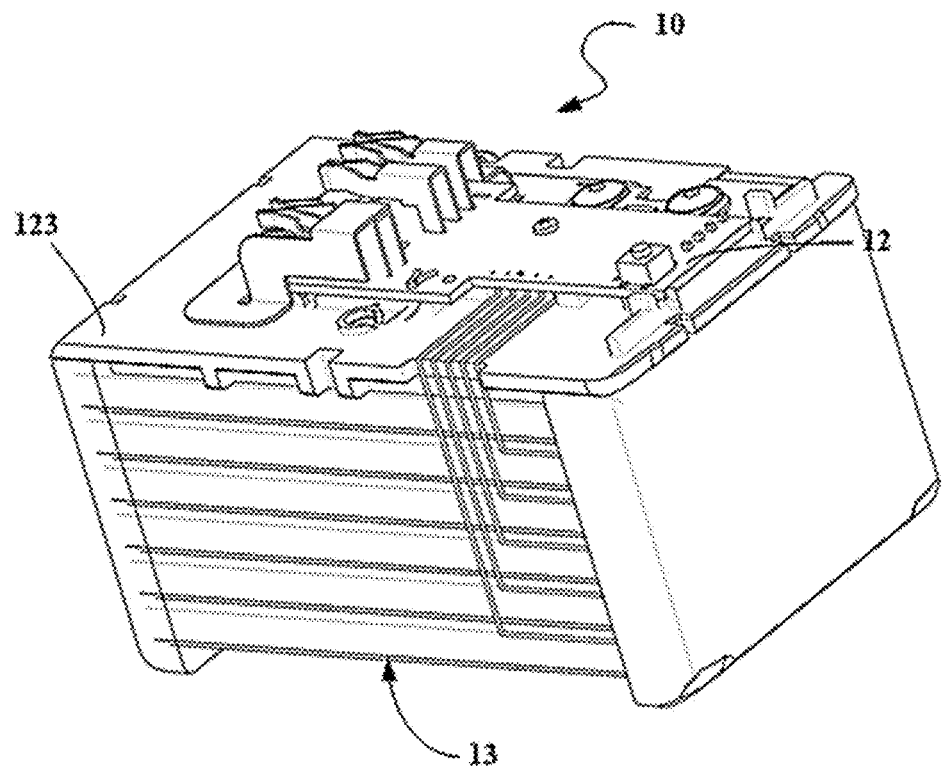
FIG. 5 is an internal structure view of a battery pack with a housing removed according to an example.

As shown in FIG. 5, the battery pack 10 further includes a circuit board support member 123 disposed between the circuit board 12 and the cell assembly 13 so as to support and fix the circuit board 12. In one example, a distance between a lower surface of the circuit board 12 and the upper surface of the cell assembly 13 is greater than or equal to 5 mm. The circuit board support member 123 is disposed between the circuit board 12 and the upper surface of the cell assembly 13 or a preset distance is reserved between the circuit board 12 and the upper surface of the cell assembly 13 so that an effect of heating of the cell assembly 13 on the circuit board 12 can be reduced and the battery pack 10 can work normally.

Figure 6:
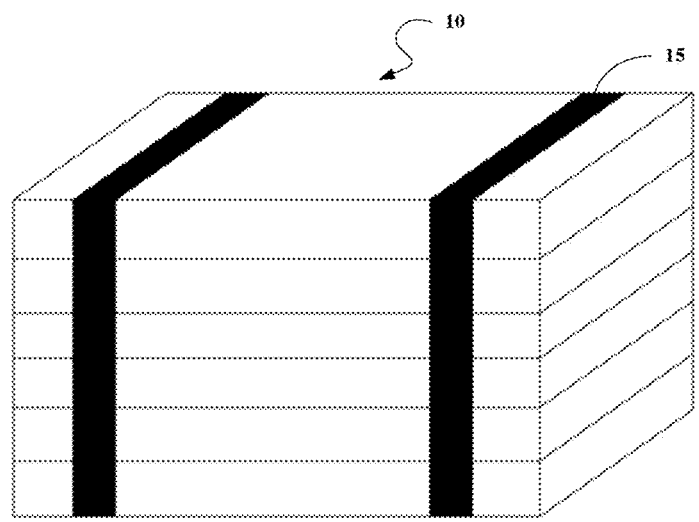
FIG. 6 is a structure view of a battery pack including a buffer according to an example.

As shown in FIG. 6, the battery pack 10 further includes a buffer 15 and the buffer 15 is wound around the upper surface, the first side surface, the lower surface, and the second side surface of the cell assembly 13 so as to fix the cell assembly 13. The buffer 15 is foam. The foam may be, but not limited to, expanded polyethylene foam. The buffer 15 may also be another elastic member having a buffer function. The buffer 15 is wound along the surfaces of the cell assembly 13 so as to support and position the battery pack 10 and prevent the battery pack 10 from dropping.

Figure 7:
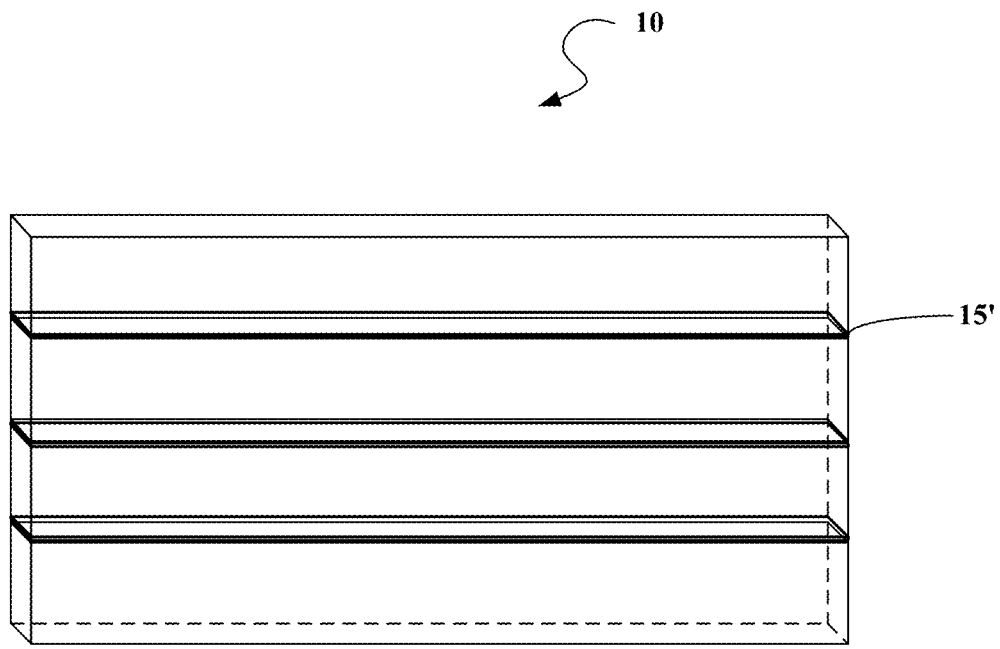
FIG. 7 is a structure view of a battery pack including a buffer according to an example.

In other examples, as shown in FIG. 7, the battery pack 10 further includes a buffer layer 15'. The buffer layer 15' is disposed between adjacent cells 131 and made of the same material as the cell support member 14. In one example, the buffer layer 15' is made of an elastic material with a compression ratio higher than or equal to 50%, elongation at break higher than or equal to 100%, tensile strength higher than or equal to 0.9 N/mm$^2$, and thermal conductivity higher than or equal to 0.6 W/(m·k). The buffer layer 15' disposed between adjacent cells 131 can improve the anti-dropping and shock absorption performance of the battery pack 10 and further improve the reliability of the battery pack 10. In addition, the buffer layer 15' is an elastic member and can better adapt to the expansion property of the battery pack 10. Furthermore, the buffer layer 15' can also enable the temperature of the cell 131 to be uniformly distributed and improve the heat dissipation performance of the battery pack 10. In one example, the buffer layer 15' is formed between the plurality of cells 131 through the glue injection and integrally formed with the cell support member 14.

Figure 8:
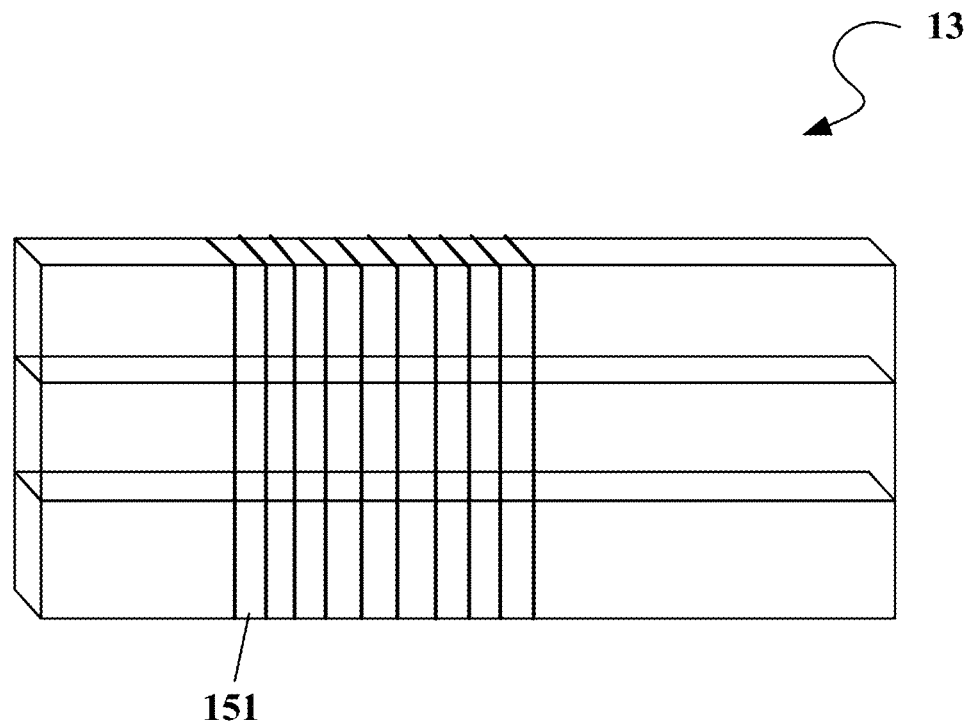
FIG. 8 is a structure view of a battery pack including an elastic tape according to an example.

Referring to FIG. 8, in one example, an elastic tape 151 is wound around the upper surface, the first side surface, the lower surface, and the second side surface of the cell assembly 13 so as to bind the cell assembly 13 together, and such an elastic tape 151 also has the function of supporting the cell assembly 13. In some cases, the cell assembly 13 is taken out from the housing 11 and charged. After being charged, the cell assembly 13 will expand. The cell assembly 13 that expands too much cannot be installed into the housing 11 and used again. Therefore, the elastic tape 151 wound around the cell assembly 13 can avoid a risk when the cell assembly 13 that expands too much after being charged is used again. In one example, the elastic tape 151 may also be wound around the left end surface 133, the right end surface 134, the upper surface, and the lower surface of the cell assembly 13, or the elastic tape 151 may also be wound around the left end surface 133, the right end surface 134, the first side face, and the second side face of the cell assembly 13, so as to enclose the tabs 132 and bind the cell assembly 13 together. Such an elastic tape 151 also has the function of supporting the cell assembly 13 to prevent the relative displacement between the plurality of cells 131 due to bumping or shocks so that the plurality of cells 131 or the plurality of tabs 132 are prevented from being squeezed or kinked. In addition, the elastic tape 151 can improve the anti-dropping and shock absorption performance of the battery pack 10 and further improve the reliability of the battery pack 10. The elastic tape 151 is the elastic member and can better adapt to the expansion property of the battery pack 10.

Table 1 shows data of the battery pack 10 provided with the cell support member 14 for a three-meter drop test.

TABLE 1

| Physical Quantity | Before Drop Test | | After Drop Test | |
|---|---|---|---|---|
| | Voltage | Internal Resistance | Voltage | Internal Resistance |
| Value | 21 V | 16.0 mΩ | 20.855 | 16.1 mΩ |

Before the drop test, the voltage and internal resistance of the battery pack 10 are measured and recorded as 21 V and 16.0 mΩ, respectively. After six drop tests are performed, a surface temperature of the battery pack 10 has no abnormality within two hours, and the voltage and internal resistance of the battery pack 10 are measured again. The voltage is 20.855 V and the internal resistance is 16.1 mΩ. After the drop test, the voltage and internal resistance of the battery pack 10 are hardly changed.

As can be seen from Table 1, for the battery pack 10 with the cell support member 14, the cell support member 14 better supports and positions the battery pack 10 and improves the anti-dropping and shock absorption performance of the battery pack 10.

Figure 9:
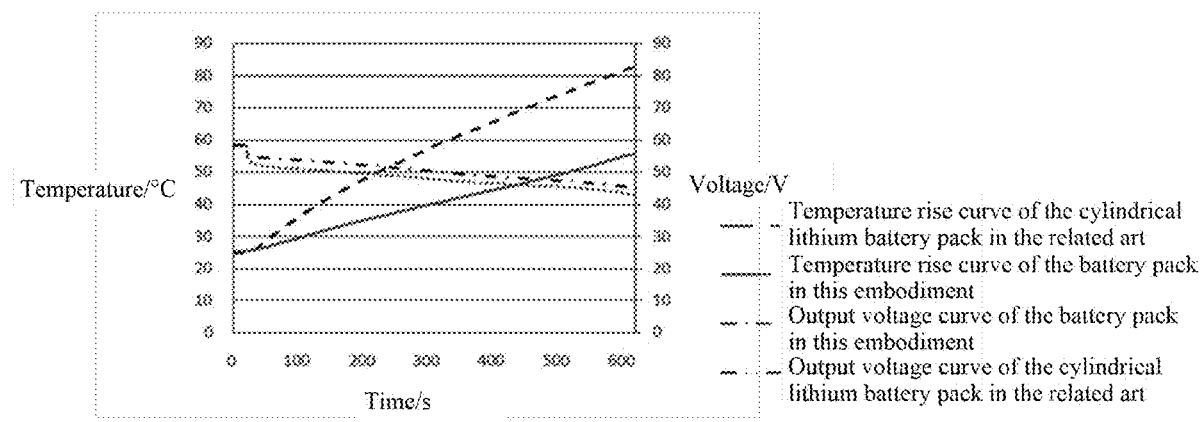
FIG. 9 is a graph of a temperature rise test for a battery pack according to an example and a cylindrical lithium battery pack in the related art.

Referring to FIG. 9 which is a comparison graph of a temperature rise test for the battery pack 10 and a cylindrical lithium battery pack in the related art, temperature rises of the two battery packs are compared, where the two battery packs discharge at a constant current of 40 A. After discharging at the constant current for 600 s, the cylindrical lithium battery pack has a maximum temperature of 83.15° C. and the battery pack 10 has a maximum temperature of 56.15° C. In this process, an average output voltage of the cylindrical lithium battery pack is 48 V, and an average output voltage of the battery pack 10 is 50.3 V.

Therefore, the battery pack 10 has better heat dissipation performance than the cylindrical lithium battery pack in the related art. The encapsulation member 1311 of the cell 131 is conducive to heat dissipation of the battery pack 10. The average voltage outputted by the battery pack 10 is 2.3 V higher than the average voltage outputted by the cylindrical lithium battery pack, that is, the battery pack 10 has higher output power at the same load current.

Figure 10:
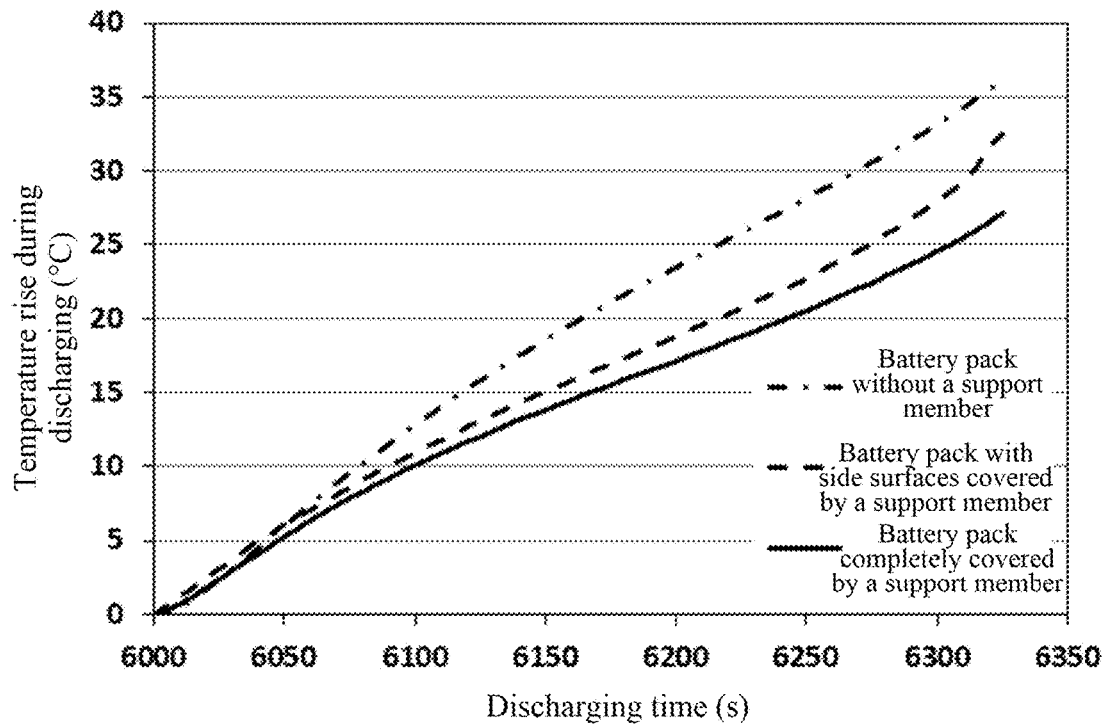
FIG. 10 is a graph of a temperature rise test for battery packs with/without a support assembly according to an example.

Referring to FIG. 10, the temperature rise test is performed on the battery pack 10. Samples 1, 2, and 3 are prepared, which are a battery pack without a cell support member, a battery pack completely covered by the cell support member, and a battery pack with side surfaces covered by the cell support member, respectively. The temperature rise test includes steps below. At a temperature of 25° C.±2° C., the samples 1, 2, and 3 are charged at a constant current of 2 C (C refers to a charging/discharging rate) to 21 V. At a constant voltage of 21 V, the samples 1, 2 and 3 are charged until the current is reduced to 0.02 C. The samples 1, 2, and 3 stand for 1 hour. The samples 1, 2, and 3 discharge to 15 V at a constant current of 10 C. During discharging, the temperatures of the battery packs are tested and the temperature of each sample battery pack is measured.

As can be seen from FIG. 10, the battery pack 10 with the cell support member 14 has better heat dissipation performance. The cell support member 14 is conducive to heat dissipation of the cell assembly 13 to prevent the battery pack 10 from being damaged due to overheating.

Referring to FIG. 4, the battery pack 10 further includes a first sensor 16.

The first sensor 16 is electrically connected to the circuit board 12 and configured to detect a temperature of the cell assembly 13. In one example, the first sensor 16 is configured to detect a temperature of the cell 131, and when the temperature of the cell 131 exceeds a threshold, the battery pack 10 stops outputting the electrical energy. In one example, the first sensor 16 is disposed on a side of the tab 132 facing towards the cell support member 14. In other examples, the first sensor 16 may also be placed on the cell assembly 13. One first sensor 16 or a plurality of first sensors 16 may be disposed. The first sensor 16 may be a thermistor, a thermocouple, a digital temperature sensor, or the like.

In this example, the first sensor 16 is disposed so that the cell 131 can be prevented from too high a temperature and safety problems can be avoided during use.

Figure 11:
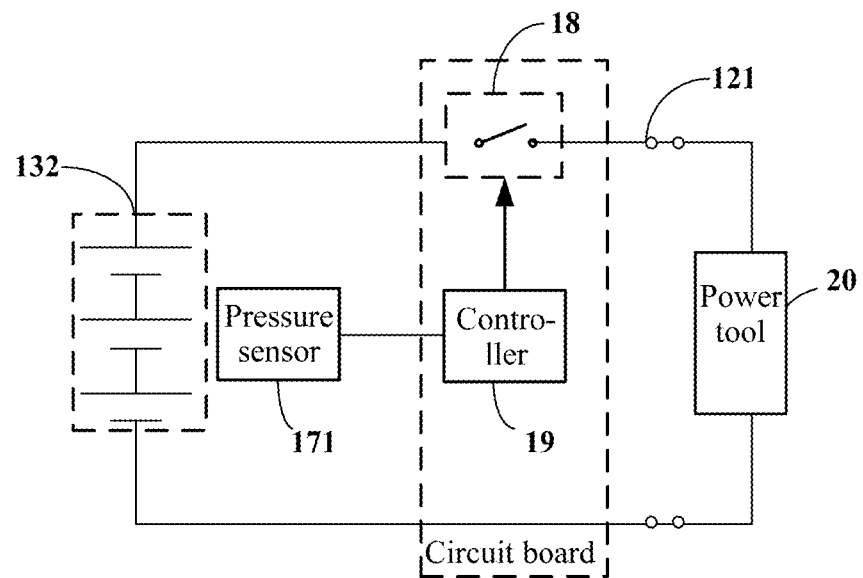
FIG. 11 is a block diagram of a protection circuit of a battery pack according to an example.
Figure 12:
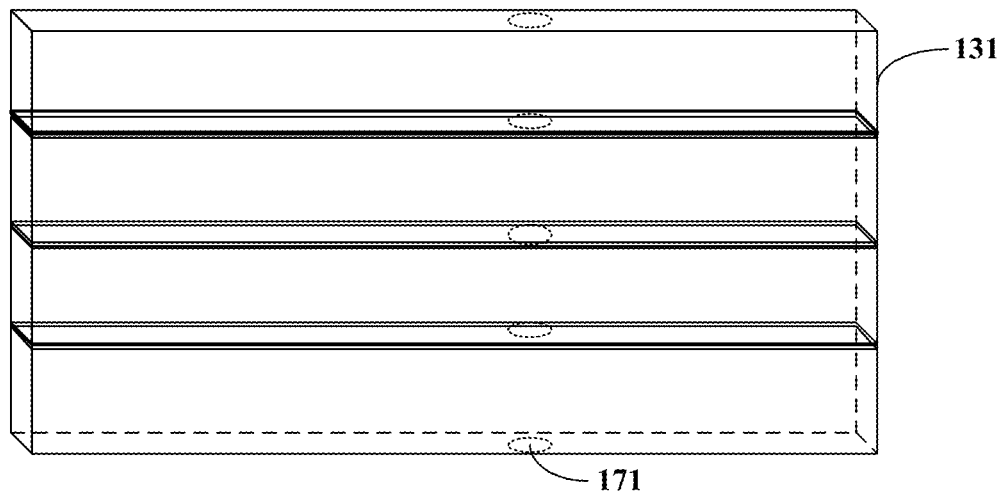
FIG. 12 is a schematic diagram illustrating a position of a pressure sensor according to an example.

Referring to FIGS. 11 and 12, the battery pack 10 further includes a second sensor 17, a switch 18, and a controller 19.

The second sensor 17 is configured to detect a parameter related to leakage of the cell 131; the switch 18 is configured to make or break an electrical connection between the tab 132 and the battery pack terminal 121; and the controller 19 is configured to output a control signal for turning off the switch 18 so as to break the electrical connection between the battery pack terminal 121 and the tab 132 in the case where the second sensor 17 detects that the parameter related to the leakage of the cell 131 is greater than or equal to a parameter threshold.

In one example, the second sensor 17 is a pressure sensor 171. The pressure sensor 171 is configured to detect an amount of deformation of the cell 131. In one example, the pressure sensor 171 is configured to detect an amount of deformation of the encapsulation member 1311. When the amount of deformation of the encapsulation member 1311 of any one of the cells 131 exceeds a threshold, the pressure sensor 17 sends a signal to the controller 19. In one example, the pressure sensor 171 is disposed between adjacent cells 131 so that the pressure sensor 171 detects the amount of deformation with higher sensitivity. In other examples, the pressure sensors 171 may be disposed on the upper surface of the cell assembly 13, on the lower surface of the cell assembly 13, and between adjacent cells 131 of the cell assembly 13, or the pressure sensor 171 may be disposed at any position of the upper surface of the cell assembly 13, the lower surface of the cell assembly 13, and a position between adjacent cells 131 of the cell assembly 13.

In one example, the pressure sensor 171 may be one of or a combination of pressure sensors such as a semiconductor piezoresistive sensor and an electrostatic capacitive pressure sensor.

The switch 18 is electrically connected between the tab 132 and the battery pack terminal 121 and configured to make or break the electrical connection between the tab 132 and the battery pack terminal 121. The switch 18 is controlled by the controller 19 to be turned on or off. The switch 18 is disposed on the circuit board 12. The switch 18 may be an electronic switch such as a metal-oxide-semiconductor field-effect transistor (MOSFET), an insulated-gate bipolar transistor (IGBT), or a relay. In one example, the switch 18 may also be a mechanical switch.

The controller 19 is electrically connected to the pressure sensor 171 and the switch 18 separately. The controller 19 receives the signal from the pressure sensor 171 and turns off the switch 18 when the encapsulation member 1311 expands and the pressure sensor 171 detects that the amount of deformation of the encapsulation member 1311 exceeds the threshold so that the battery pack 10 stops outputting the electrical energy.

In one example, the mechanical switch is used as the switch 18 and connected between the tab 132 and the battery pack terminal 121. The mechanical switch is configured to make or break the electrical connection between the tab 132 and the battery pack terminal 121. When the encapsulation member 1311 expands to a preset level, the mechanical switch is ejected so that the battery pack 10 stops outputting the electrical energy.

Figure 13:
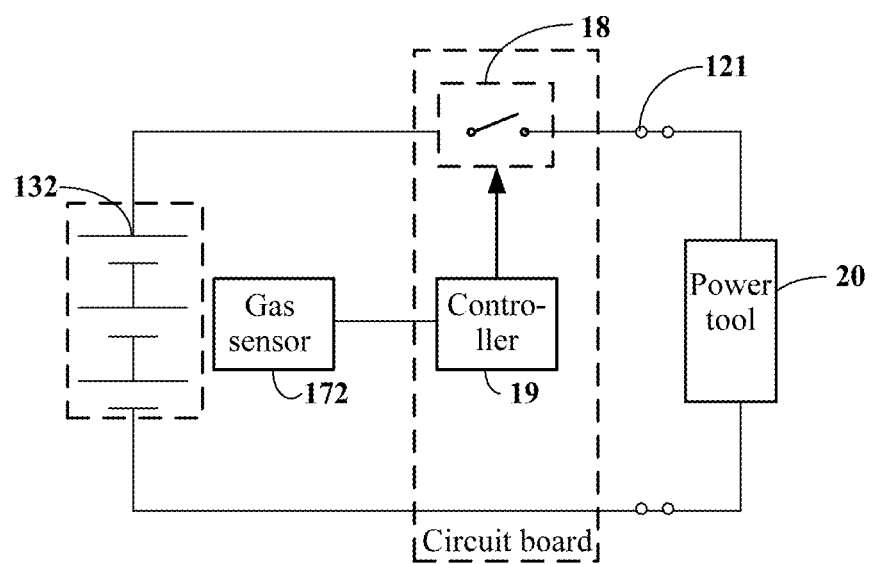
FIG. 13 is a block diagram of a protection circuit of a battery pack according to an example.
Figure 14:
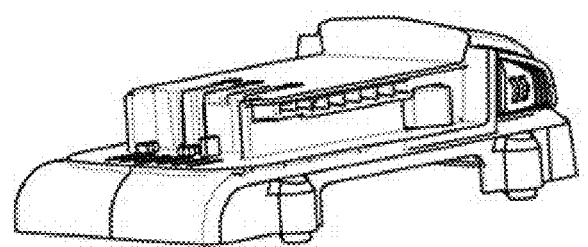
FIG. 14 is a schematic view illustrating a position of a gas sensor according to an example.
Figure 14:
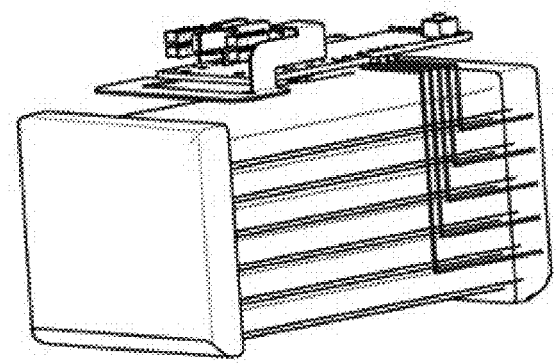
Figure 14:
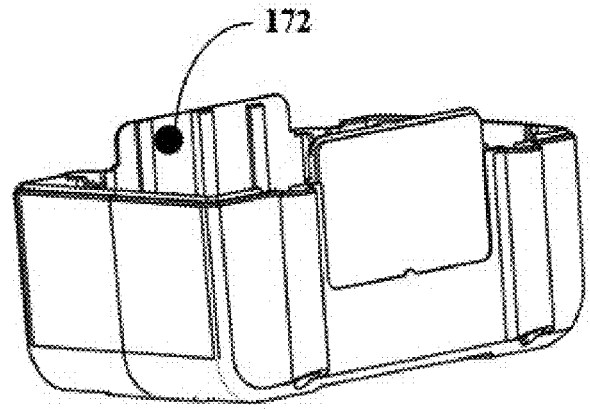

In other examples, referring to FIGS. 13 and 14, the second sensor 17 is a gas sensor 172 configured to detect a gas concentration in the housing 11. The gas sensor 172 sends a signal to the controller 19 when the gas sensor 172 detects that the gas concentration in the housing 11 is higher than or equal to a concentration threshold. In one example, the gas sensor 172 is disposed at a position close to the cell assembly 13 in the housing 11 of the battery pack so that the gas sensor 172 detects the gas concentration with higher sensitivity. In other examples, the gas sensor 172 may be disposed on any surface of the cell assembly 13.

The controller 19 is electrically connected to the gas sensor 172 and the switch 18 separately. The controller 19 receives the signal from the gas sensor 172 and turns off the switch 18 to break the electrical connection between the tab 132 and the battery pack terminal 121 when the gas sensor 172 detects that the gas concentration in the housing 11 is higher than or equal to the concentration threshold.

When the encapsulation member 1311 is damaged due to the expansion of the encapsulation member 1311 and gas is volatilized, the gas sensor 172 detects that the gas concentration in the housing 11 is higher than or equal to the concentration threshold, and the gas sensor sends the signal to the controller 19. The controller 19 receives the signal from the gas sensor 172 and turns off the switch 18 to break the electrical connection between the tab 132 and the battery pack terminal 121.

Figure 15:
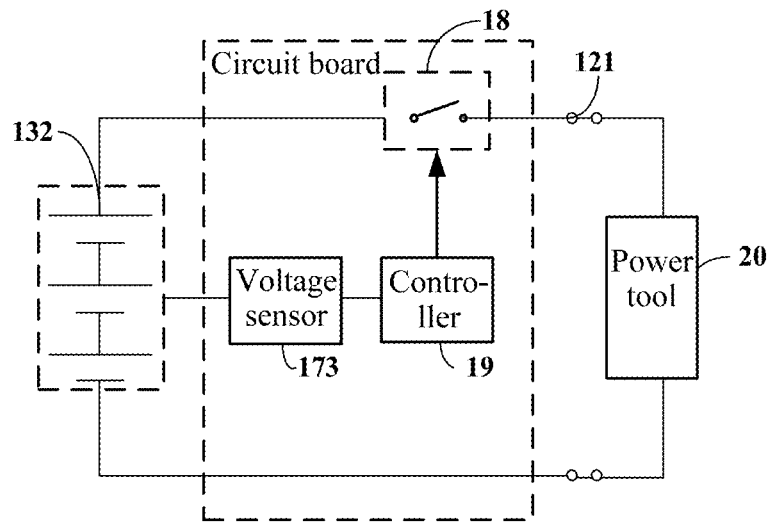
FIG. 15 is a block diagram of a protection circuit of a battery pack according to an example.
Figure 15:
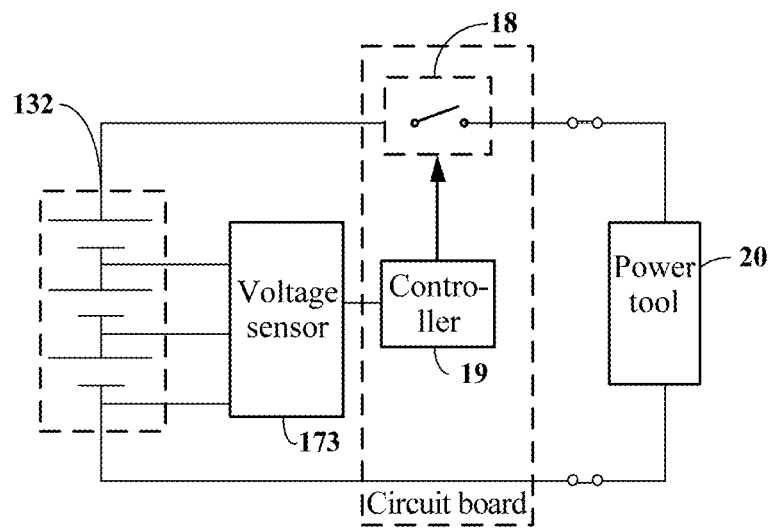

In one example, referring to FIG. 15, the second sensor 17 is a voltage sensor 173.

The voltage sensor 173 is configured to detect a voltage of the cell 131. The voltage sensor 173 is disposed on the circuit board 12, the voltage sensor 173 is electrically connected to the controller 19, and when the voltage sensor 173 detects that the voltage of the cell 131 quickly decreases, the voltage sensor 173 sends a signal to the controller 19. In one example, the voltage sensor 173 may also be disposed on the tab 132.

The controller 19 is electrically connected to the voltage sensor 173 and the switch 18 separately. When the voltage sensor 173 detects that a rate at which the voltage of the cell 131 decreases is higher than or equal to a rate threshold, the controller 19 receives the signal from the voltage sensor 173 and turns off the switch 18 to break the electrical connection between the tab 132 and the battery pack terminal 121.

After the encapsulation member 1311 is damaged, the voltage of the cell 131 decreases quickly. When the voltage sensor 173 detects that the rate at which the voltage of the cell 131 decreases is higher than or equal to the rate threshold, the voltage sensor 173 sends the signal to the controller 19. The controller 19 receives the signal from the voltage sensor 173 and turns off the switch 18 to break the electrical connection between the tab 132 and the battery pack terminal 121.

In this example, the battery pack 10 is provided with the second sensor 17 so that a change of an internal parameter of the battery pack 10 can be detected. The battery pack 10 can stop outputting the electrical energy in time when the encapsulation member 1311 is damaged so that safety performance of the battery pack 10 is improved.

Figure 16:
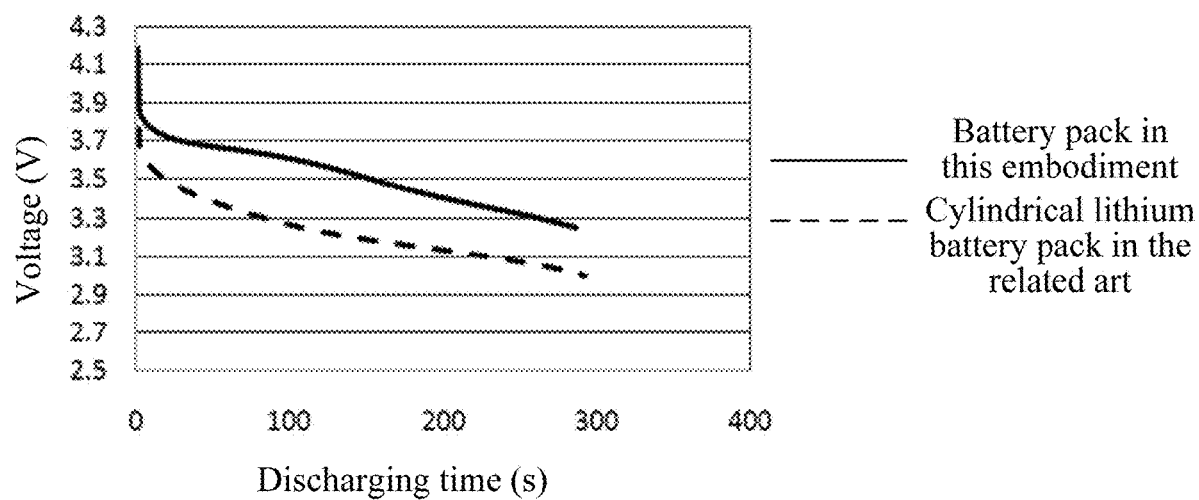
FIG. 16 is a graph illustrating discharge curves of a battery pack according to an example and a cylindrical lithium battery pack in the related art.

Referring to FIG. 16 which is a comparison graph illustrating discharge curves of the battery pack 10 in this example and the cylindrical lithium battery pack in the related art, the battery packs discharge at a rate of 10 C, where 10 C represents a current density when the battery pack completely discharges for 0.1 hours. When discharging at a nominal voltage (3.6 V) of the cell, the battery pack 10 in this example can keep discharging for more than 100 s while the cylindrical lithium battery pack in the related art can keep discharging for merely 6 s. Therefore, at the same discharging rate, the battery pack 10 in this example has a higher voltage and higher efficiency.

Figure 17:
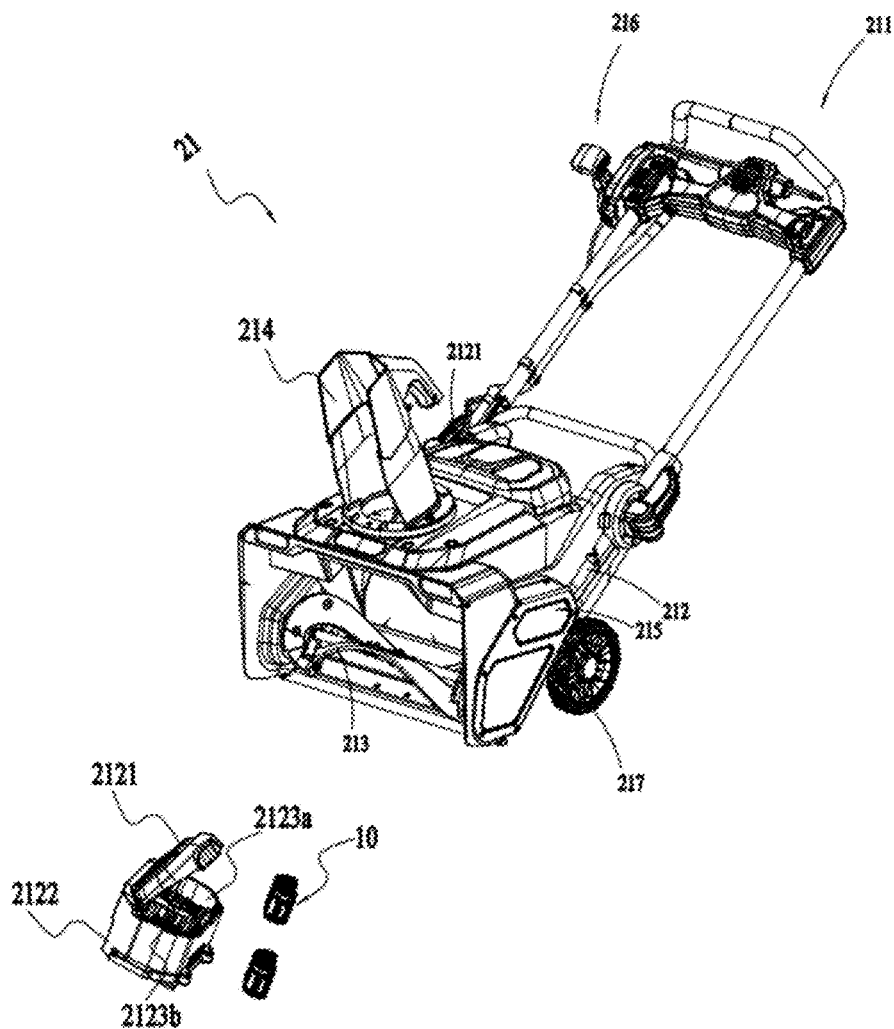
FIG. 17 is a schematic view of a battery pack and a hand-propelled snow thrower.

FIG. 17 illustrates a power tool and a battery pack 10 which is applicable to the power tool so as to supply electricity to the power tool. In FIG. 17, the power tool is a hand-propelled snow thrower 21. The battery pack 10 supplies electrical energy to the snow thrower 21. The snow thrower 21 includes a handle device 211, a housing assembly 212, an auger 213, a snow throwing device 214, a motor 215, an angle adjusting device 216, and wheels 217. The handle device 211 is operated by a user, and the housing assembly 212 accommodates or fixes the motor 215. The auger 213 is a functional element of the snow thrower 21. The motor 215 drives the auger 213 to rotate to implement a snow sweeping function. An axis about which the motor 215 rotates is parallel to an axis about which the auger 213 rotates. The battery pack 10 is electrically connected to the motor 215 to supply electric power to the motor 215. The wheels 217 rotate relative to the housing assembly 212 so that the snow thrower 21 travels on the ground. The snow throwing device 214 is configured to change a movement path of snow to guide the snow to a distant place. A body 22 implements the snow sweeping function. The housing assembly 212, the auger 213, and the motor 215 form the body of the snow thrower 21. The battery pack 10 is detachably connected to the body. The battery pack 10 may be a single battery pack or may be a plurality of battery packs. The housing assembly 212 includes a body housing and further includes a battery compartment cover 2121 and a battery compartment body 2122. The battery compartment cover 2121 and the battery compartment body 2122 make encirclement to form a battery compartment for accommodating the battery pack 10. In this example, at least part of the battery compartment body 2122 is accommodated in an accommodating cavity formed by the body housing. The battery compartment includes two cavities divided by the battery compartment body 2122, that is, a first cavity 2123*a* and a second cavity 2123*b*, and two battery packs 10 are respectively mounted into the first cavity 2123*a* and the second cavity 2123*b*.

Figure 18:
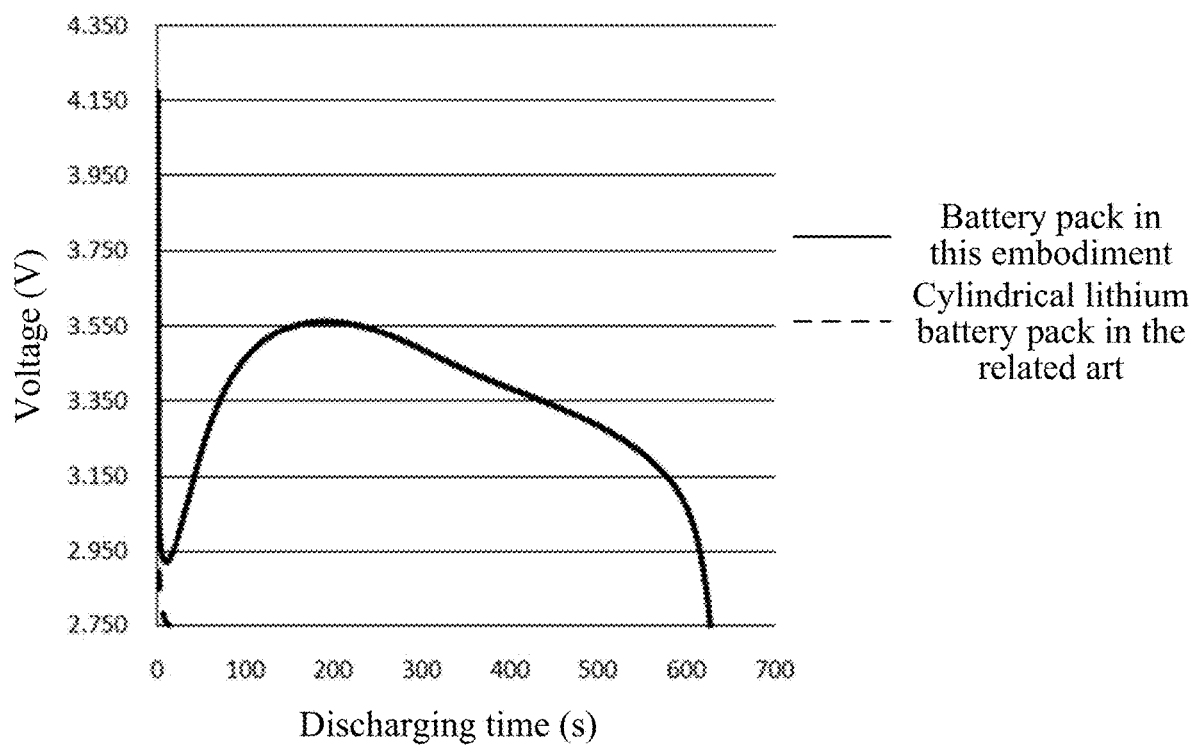
FIG. 18 is a graph illustrating discharge curves of a battery pack according to an example and a cylindrical lithium battery pack in the related art at a low temperature.

Referring to FIG. 18, the battery pack discharges at a rate of 5 C after being placed for 12 hours at a temperature of −20° C., where 5 C represents a current intensity when the battery pack completely discharges for ⅕ hours. The cylindrical lithium battery pack in the related art supplies electricity for about 15 s and then enters undervoltage protection (where an undervoltage critical value is set to 2.75 V). Therefore, the cylindrical lithium battery pack in the related art cannot output electrical energy after entering the undervoltage protection. The battery pack 10 in this example can keep discharging. The cell assembly 13 can discharge at a rate of 5 C at an ambient temperature T, where −22° C.≤T≤−15° C., and 5 C represents the current intensity when the cell assembly completely discharges for ⅕ hours. In one example, the cell assembly 13 can discharge at the rate of 5 C at the ambient temperature T, where −22° C.≤T≤−18° C. In other examples, the cell assembly 13 can discharge at a rate higher than or equal to 5 C. The battery pack 10 in this example can work in a low-temperature environment and supply electricity to a power tool which needs to work under a low-temperature condition, thus overcoming the defect of the cylindrical lithium battery pack in the related art that an electrical energy output is affected due to too low an ambient temperature in the low-temperature environment.

Figure 19:
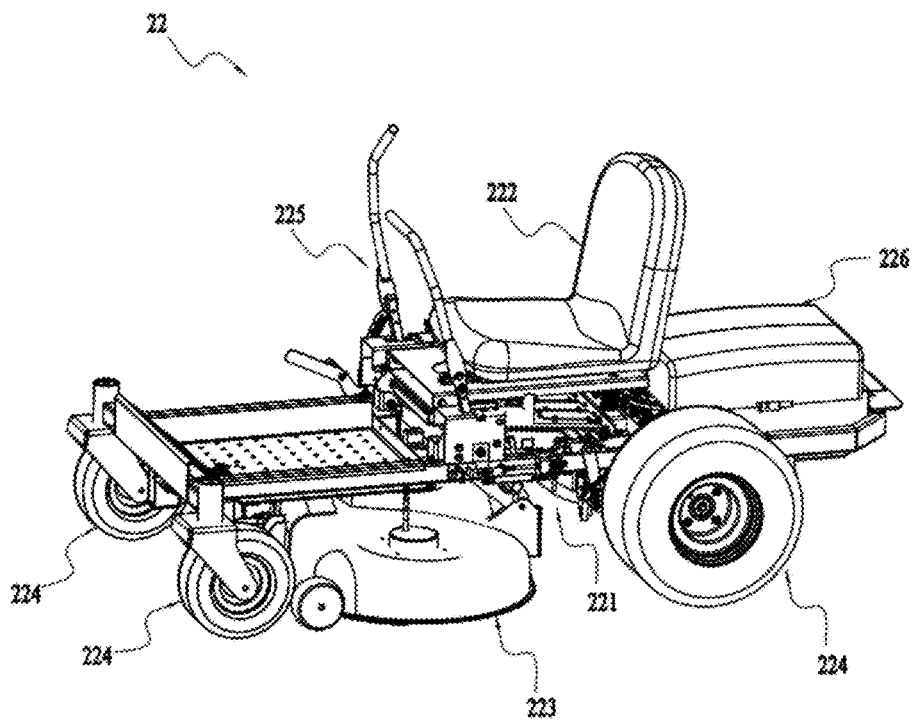
FIG. 19 is a schematic view of a mower.
Figure 20:
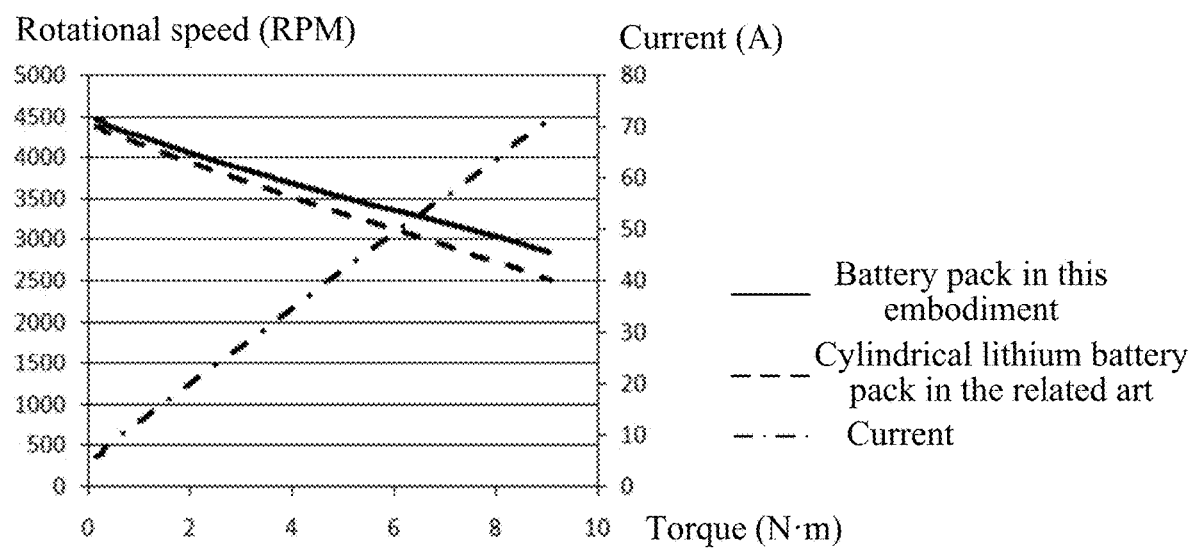
FIG. 20 is a graph of a mechanical performance test for a mower according to an example.

The battery pack 10 can also supply electrical energy to a mower 22. Referring to FIG. 19, the mower 22 includes a frame 221, a seat 222, a mowing unit 223, a walking unit 224, an operating device 225, a power supply device 226, and a control unit. The battery pack 10 is disposed in the power supply device 226. Referring to FIG. 20 which is a graph of a mechanical performance test for the mower 22, when an output current of the battery pack 10 is 50 A, a rotational speed of the mower 22 powered by the battery pack 10 in this example is 7.4% higher than a rotational speed of the mower 22 powered by the cylindrical lithium battery pack in the related art; when the output current of the battery pack 10 is 72 A, the rotational speed of the mower 22 powered by the battery pack 10 in this example is 13.3% higher than the rotational speed of the mower 22 powered by the cylindrical lithium battery pack. Therefore, under a heavy load condition, the battery pack 10 is more advantageous and has a higher rotational speed and higher output power than the cylindrical lithium battery pack.

Figure 21:
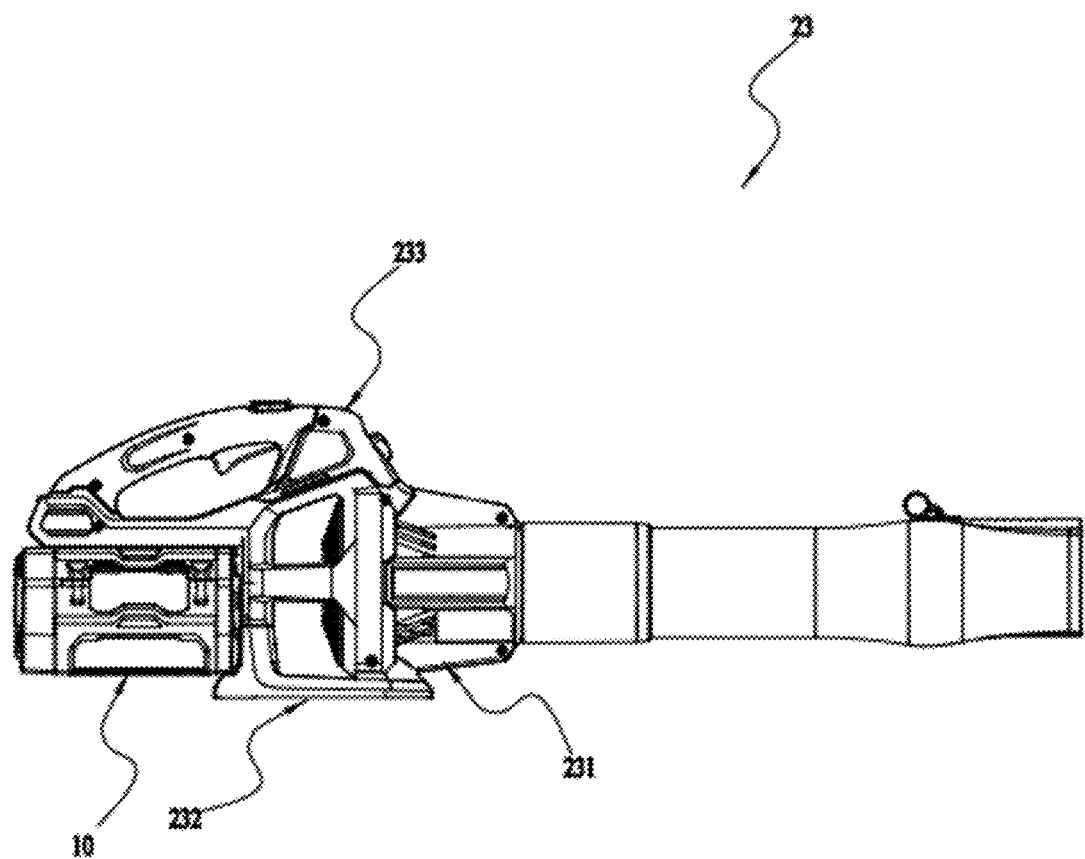
FIG. 21 is a schematic view of a blower.

In one example, a power tool is a blower 23. Referring to FIG. 21, the blower 23 includes a motor 231 having a stator and a rotor; an output shaft driven by the rotor of the motor 231; a fan 232 connected to the output shaft and driven by the motor 231 to rotate; and a housing 233 and a battery pack 10. The battery pack 10 includes a battery group. The battery group includes one sheet-shaped cell or a plurality of sheet-shaped cells that are stacked. The battery group has an upper surface, a lower surface, a front surface, a rear surface, a first side surface, and a second side surface. One tab or a plurality of tabs are disposed on the first side surface of the battery group. A cell support member group is further included. The cell support member group includes at least one cell support member. The at least one cell support member at least encapsulates the one tab or the plurality of tabs on the first side surface of the battery group. The at least one cell support member is made of an elastic material. The cell support member has a compression ratio higher than or equal to 50%. The cell support member has elongation at break higher than or equal to 100%. The cell support member has tensile strength higher than or equal to 0.9 N/mm². The cell support member has thermal conductivity higher than or equal to 0.6 W/(m·k). The power tool further includes a first sensor configured to detect a temperature of the sheet-shaped cell and disposed on a side of the tab facing towards the cell support member. The power tool further includes a second sensor configured to detect a parameter related to leakage of the sheet-shaped cell and disposed in the cell assembly. The power tool further includes a battery pack terminal electrically connected to the tab. The power tool further includes a controller configured to output a control signal for turning off the switch so as to break an electrical connection between the battery pack terminal and the tab in the case where the second sensor detects that the parameter related to the leakage of the cell is greater than or equal to a parameter threshold.

In one example, a power tool is a handheld power tool. The handheld power tool includes a motor having a stator and a rotor; an output shaft driven by the rotor of the motor; a tool accessory shaft configured to support a tool accessory; a transmission device configured to connect the output shaft to the tool accessory shaft so as to transmit torque outputted from the motor to the tool accessory; and a battery pack connected to the handheld power tool. The battery pack includes a battery group. The battery group includes one sheet-shaped cell or a plurality of sheet-shaped cells that are stacked. The battery group has an upper surface, a lower surface, a front surface, a rear surface, a first side surface, and a second side surface. One first tab or a plurality of first tabs are disposed on the first side surface, and one second tab or a plurality of second tabs are disposed on the second side surface. A support member group is further included. The support member group includes a first support member and a second support member. The first support member is disposed on the first side surface of the battery group and extends to the upper surface, the lower surface, the front surface, and the rear surface of the battery group. The second support member is disposed on the second side surface of the battery group and extends to the upper surface, the lower surface, the front surface, and the rear surface of the battery group. The first support member and the second support member are each made of an elastic material.

In one example, a power tool is a handheld power tool. The handheld power tool includes a motor having a stator and a rotor; an output shaft driven by the rotor of the motor; a tool accessory shaft configured to support a tool accessory; a transmission device configured to connect the output shaft to the tool accessory shaft so as to transmit torque outputted from the motor to the tool accessory; and a battery pack connected to the handheld power tool. The battery pack includes a battery group. The battery group includes one sheet-shaped cell or a plurality of sheet-shaped cells that are stacked. The battery group has an upper surface, a lower surface, a front surface, a rear surface, a first side surface, and a second side surface. One first tab or a plurality of first tabs are disposed on the first side surface, and one second tab or a plurality of second tabs are disposed on the second side surface. A support member group is further included. The support member group includes a first support member and a second support member. The first support member is disposed on the first side surface of the battery group and extends to at least one or more surfaces among the upper surface, the lower surface, the front surface, and the rear surface of the battery group. The second support member is disposed on the second side surface of the battery group and extends to at least one or more surfaces among the upper surface, the lower surface, the front surface, and the rear surface of the battery group. The first support member and the second support member are each made of an elastic material.

In one example, a power tool is a handheld power tool. The handheld power tool includes a motor having a stator and a rotor; an output shaft driven by the rotor of the motor; a tool accessory shaft configured to support a tool accessory; a transmission device configured to connect the output shaft to the tool accessory shaft so as to transmit torque outputted from the motor to the tool accessory; and a battery pack connected to the handheld power tool. The battery pack includes a battery group. The battery group includes one sheet-shaped cell or a plurality of sheet-shaped cells that are stacked. The battery group has an upper surface, a lower surface, a front surface, a rear surface, and a first side surface. One first tab or a plurality of first tabs are disposed on the first side surface. A support member group is further included. The support member group includes at least one support member. The at least one support member is made of an elastic material.

In one example, a power tool is a handheld power tool. The handheld power tool includes a motor having a stator and a rotor; an output shaft driven by the rotor of the motor; a tool accessory shaft configured to support a tool accessory; a transmission device configured to connect the output shaft to the tool accessory shaft so as to transmit torque outputted from the motor to the tool accessory; a battery pack connected to the handheld power tool; and a support member group. The battery pack includes a battery group. The battery group includes one sheet-shaped cell or a plurality of sheet-shaped cells that are stacked. One first tab or a plurality of first tabs are disposed on a first side surface of the battery group. The support member group includes at least one support member. The at least one support member at least encapsulates the one first tab or the plurality of first tabs on the first side surface of the battery group. The at least one support member is made of an elastic material.

In one example, a power tool is a handheld power tool. The handheld power tool includes a motor having a stator and a rotor; an output shaft driven by the rotor of the motor; a tool accessory shaft configured to support a tool accessory; a transmission device configured to connect the output shaft to the tool accessory shaft so as to transmit torque outputted from the motor to the tool accessory; and a battery pack connected to the handheld power tool. The battery pack includes a battery group. The battery group includes one sheet-shaped cell or a plurality of sheet-shaped cells that are stacked. The battery group has an upper surface, a lower surface, a front surface, a rear surface, a first side surface, and a second side surface. One first tab or a plurality of first tabs are disposed on the first side surface. A support member group is further included. The support member group includes at least one support member. The at least one support member is disposed on the first side surface of the battery group and extends to at least one or more surfaces among the upper surface, the lower surface, the front surface, and the rear surface. The at least one support member is made of an elastic material.

In one example, a power tool includes a motor having a stator and a rotor; an output shaft driven by the rotor of the motor; a fan connected to the output shaft and driven by the motor to rotate; and a battery pack interface configured to connect a battery pack. The battery pack includes a battery group. The battery group includes one sheet-shaped cell or a plurality of sheet-shaped cells that are stacked. The battery group has an upper surface, a lower surface, a front surface, a rear surface, a first side surface, and a second side surface. One first tab or a plurality of first tabs are disposed on the first side surface, and one second tab or a plurality of second tabs are disposed on the second side surface. A support member group is further included. The support member group includes a first support member and a second support member. The first support member is disposed on the first side surface of the battery group and extends to the upper surface, the lower surface, the front surface, and the rear surface of the battery group. The second support member is disposed on the second side surface of the battery group and extends to the upper surface, the lower surface, the front surface, and the rear surface of the battery group. The first support member and the second support member are each made of an elastic material.

In one example, a power tool includes a motor having a stator and a rotor; an output shaft driven by the rotor of the motor; a fan connected to the output shaft and driven by the motor to rotate; and a battery pack interface configured to connect a battery pack. The battery pack includes a battery group. The battery group includes one sheet-shaped cell or a plurality of sheet-shaped cells that are stacked. The battery group has an upper surface, a lower surface, a front surface, a rear surface, a first side surface, and a second side surface. One first tab or a plurality of first tabs are disposed on the first side surface, and one second tab or a plurality of second tabs are disposed on the second side surface. A support member group is further included. The support member group includes a first support member and a second support member. The first support member is disposed on the first side surface of the battery group and extends to at least one or more surfaces among the upper surface, the lower surface, the front surface, and the rear surface of the battery group. The second support member is disposed on the second side surface of the battery group and extends to at least one surface or more surfaces among the upper surface, the lower surface, the front surface, and the rear surface of the battery group. The first support member and the second support member are each made of an elastic material.

In one example, a power tool includes a motor having a stator and a rotor; an output shaft driven by the rotor of the motor; a fan connected to the output shaft and driven by the motor to rotate; and a battery pack interface configured to connect a battery pack. The battery pack includes a battery group. The battery group includes one sheet-shaped cell or a plurality of sheet-shaped cells that are stacked. The battery group has an upper surface, a lower surface, a front surface, a rear surface, a first side surface, and a second side surface. One first tab or a plurality of first tabs are disposed on the first side surface. A support member group is further included. The support member group includes at least one support member. The at least one support member is disposed on the first side surface of the battery group and extends to at least one or more surfaces among the upper surface, the lower surface, the front surface, and the rear surface of the battery group. The at least one support member is made of an elastic material.

In one example, a power tool includes a motor having a stator and a rotor; an output shaft driven by the rotor of the motor; a fan connected to the output shaft and driven by the motor to rotate; and a battery pack interface configured to connect a battery pack. The battery pack includes a battery group. The battery group includes one sheet-shaped cell or a plurality of sheet-shaped cells that are stacked. The battery group has an upper surface, a lower surface, a front surface, a rear surface, and a first side surface. One first tab or a plurality of first tabs are disposed on the first side surface. A support member group is further included. The support member group includes at least one support member. The at least one support member is made of an elastic material.

In one example, a power tool includes a motor having a stator and a rotor; an output shaft driven by the rotor of the motor; a fan connected to the output shaft and driven by the motor to rotate; and a battery pack interface configured to connect a battery pack. The battery pack includes a battery group. The battery group includes one sheet-shaped cell or a plurality of sheet-shaped cells that are stacked. One first tab or a plurality of first tabs are disposed at least on a first side surface of the battery group. A support member group is further included. The support member group includes at least one support member. The at least one support member at least encapsulates the one first tab or the plurality of first tabs on the first side surface of the battery group. The at least one support member is made of an elastic material. The battery pack is detachably connected to the battery pack interface.

In one example, a power tool is a mower. The mower includes a body; at least one driving wheel or a driving wheel group supported by the body; a driving device or an energy storage device configured to supply torque to the at least one driving wheel or the driving wheel group; and a battery pack interface configured to connect a battery pack. The battery pack includes a battery group. The battery group includes one sheet-shaped cell or a plurality of sheet-shaped cells that are stacked. The battery group has an upper surface, a lower surface, a front surface, a rear surface, a first side surface, and a second side surface. One first tab or a plurality of first tabs are disposed on the first side surface, and one second tab or a plurality of second tabs are disposed on the second side surface. A support member group is further included. The support member group includes a first support member and a second support member. The first support member is disposed on the first side surface of the battery group and extends to the upper surface, the lower surface, the front surface, and the rear surface of the battery group. The second support member is disposed on the second side surface of the battery group and extends to the upper surface, the lower surface, the front surface, and the rear surface of the battery group. The first support member and the second support member are each made of an elastic material. The battery pack is detachably connected to the battery pack interface.

In one example, a power tool is a mower. The mower includes a body; at least one driving wheel or a driving wheel group supported by the body; a driving device or an energy storage device configured to supply torque to the at least one driving wheel or the driving wheel group; and a battery pack interface configured to connect a battery pack. The battery pack includes a battery group. The battery group includes one sheet-shaped cell or a plurality of sheet-shaped cells that are stacked. The battery group has an upper surface, a lower surface, a front surface, a rear surface, a first side surface, and a second side surface. One first tab or a plurality of first tabs are disposed on the first side surface, and one second tab or a plurality of second tabs are disposed on the second side surface. A support member group is further included. The support member group includes a first support member and a second support member. The first support member is disposed on the first side surface of the battery group and extends to at least one or more surfaces among the upper surface, the lower surface, the front surface, and the rear surface. The second support member is disposed on the second side surface of the battery group and extends to at least one or more surfaces among the upper surface, the lower surface, the front surface, and the rear surface. The first support member and the second support member are each made of an elastic material.

In one example, a power tool is a mower. The mower includes a body; at least one driving wheel or a driving wheel group supported by the body; a driving device or an energy storage device configured to supply torque to the at least one driving wheel or the driving wheel group; and a battery pack interface configured to connect a battery pack. The battery pack includes a battery group. The battery group includes one sheet-shaped cell or a plurality of sheet-shaped cells that are stacked. The battery group has an upper surface, a lower surface, a front surface, a rear surface, a first side surface, and a second side surface. One first tab or a plurality of first tabs are disposed on the first side surface. A support member group is further included. The support member group includes at least one support member. The at least one support member is disposed on the first side surface of the battery group and extends to at least one or more surfaces among the upper surface, the lower surface, the front surface, and the rear surface. The at least one support member is made of an elastic material.

In one example, a power tool is a mower. The mower includes a body; at least one driving wheel or a driving wheel group supported by the body; a driving device or an energy storage device configured to supply torque to the at least one driving wheel or the driving wheel group; and a battery pack interface configured to connect a battery pack. The battery pack includes a battery group. The battery group includes one sheet-shaped cell or a plurality of sheet-shaped cells that are stacked. The battery group has an upper surface, a lower surface, a front surface, a rear surface, and a first side surface. One first tab or a plurality of first tabs are disposed on the first side surface. A support member group is further included. The support member group includes at least one support member. The at least one support member is made of an elastic material.

In one example, a power tool is a mower. The mower includes a body; at least one driving wheel or a driving wheel group supported by the body; a driving device or an energy storage device configured to supply torque to the at least one driving wheel or the driving wheel group; and a battery pack interface configured to connect a battery pack. The battery pack includes a battery group. The battery group includes one sheet-shaped cell or a plurality of sheet-shaped cells that are stacked. One first tab or a plurality of first tabs are disposed at least on a first side surface of the battery group. A support member group is further included. The support member group includes at least one support member. The at least one support member at least encapsulates the one first tab or the plurality of first tabs on the first side surface of the battery group. The at least one support member is made of an elastic material.

Though the snow thrower, the mower, and the blower are involved in this example, it is to be understood that the present application is not limited to the disclosed examples and is applicable to other types of power tools.

What is claimed is:

1. A battery pack configured to supply electricity to a power tool and comprising:
   a housing;
   a cell assembly disposed in the housing; and
   a cell support member at least configured to support the cell assembly;
   wherein the cell assembly comprises a plurality of cells which are sheet-shaped and tabs disposed at at least one end of the cell assembly and protruding from the plurality of cells, the plurality of cells are stacked, each of the plurality of cells comprises an encapsulation member configured to encapsulate the each of the plurality of cells, the cell support member is disposed at two ends of the cell assembly, at least a part of the cell support member encapsulates the tabs, the cell support member is made of an elastic material with a compression ratio higher than or equal to 50%, the cell assembly is configured to be capable of discharging at a rate higher than or equal to 5 C at an ambient temperature T, $-22°\text{C}.\leq T\leq -15°\text{C}.$, 5 C represents a current intensity when the cell assembly completely discharges for 1/5 hours, the cell assembly has a gravimetric energy density higher than or equal to 300 wh/kg.

2. The battery pack according to claim 1, wherein the cell assembly is configured to be capable of discharging at the rate higher than or equal to 5 C at the ambient temperature T and $-22°\text{C}.\leq T\leq -18°\text{C}.$ 3. The battery pack according to claim 1, wherein the battery pack has a capacity higher than or equal to 2 Ah.

4. The battery pack according to claim 1, wherein the cell support member has elongation at break higher than or equal to 100%.

5. The battery pack according to claim 1, wherein the cell support member has tensile strength higher than or equal to 0.9 N/mm$^2$.

6. The battery pack according to claim 1, wherein the cell support member has thermal conductivity higher than or equal to 0.6 W/(m·k).

7. The battery pack according to claim 1, wherein the battery pack further comprises a first sensor configured to detect a temperature of the plurality of cells which are sheet-shaped disposed on a side of the tabs facing towards the cell support member and a second sensor configured to detect a parameter related to leakage of the plurality of cells, which are sheet-shaped, disposed in the cell assembly.

8. The battery pack according to claim 7, further comprising a battery pack terminal electrically connected to the tabs, a switch configured to make or break an electrical connection between the tabs and the battery pack terminal, and a controller configured to output a control signal for turning off the switch so as to break the electrical connection between the battery pack terminal and the tabs in a case where the second sensor detects that the parameter related to the leakage of the cell is greater than or equal to a parameter threshold.

9. The battery pack according to claim 8, wherein the switch is an insulated-gate bipolar transistor (IGBT) or a metal-oxide-semiconductor field-effect transistor (MOSFET).

10. The battery pack according to claim 8, wherein the switch is a mechanical switch.

11. The battery pack according to claim 8, wherein the second sensor is a pressure sensor configured to detect an amount of deformation of the cell, the second sensor is disposed between adjacent cells among the plurality of cells, and the controller is configured to output the control signal for turning off the switch so as to break the electrical connection between the battery pack terminal and the tabs in a case where the pressure sensor detects that the amount of deformation of the cell exceeds a deformation threshold.

12. The battery pack according to claim 8, wherein the second sensor is a gas sensor configured to detect a gas concentration in the housing and disposed in the housing and the controller is configured to output the control signal for turning off the switch so as to break the electrical connection between the battery pack terminal and the tabs in a case where the gas sensor detects that the gas concentration in the housing is higher than or equal to a concentration threshold.

13. The battery pack according to claim 8, wherein the second sensor is a voltage sensor configured to detect a voltage of the cell, the battery pack further comprises a circuit board, the voltage sensor is disposed on the circuit board, and the controller is configured to output the control signal for turning off the switch so as to break the electrical connection between the battery pack terminal and the tabs in a case where the voltage sensor detects that a rate at which the voltage of the cell decreases reaches a rate threshold.

14. The battery pack according to claim 8, wherein the second sensor is a voltage sensor configured to detect a voltage of the cell and disposed on the tab and the controller is configured to output the control signal for turning off the switch so as to break the electrical connection between the battery pack terminal and the tabs in a case where the voltage sensor detects that a rate at which the voltage of the cell decreases reaches a rate threshold.

15. The battery pack according to claim 1, wherein the cell assembly has a gravimetric energy density within a range of 1000 wh/kg to 3500 wh/kg.

16. The battery pack according to claim 1, further comprising a circuit board electrically connected to the cell assembly wherein a distance between a lower surface of the circuit board and an upper surface of the cell assembly is greater than or equal to 5 mm.

17. The battery pack according to claim 1, further comprising a buffer that surrounds an outer surface of the cell assembly so as to fix the cell assembly.

18. The battery pack according to claim 1, further comprising a buffer layer disposed between adjacent cells among the plurality of cells and made of a same material as the cell support member.

19. The battery pack according to claim 1, wherein the cell support member is formed at the two ends of the cell assembly through glue injection.

20. A battery pack configured to supply electricity to a power tool and comprising:
a housing;
a cell assembly disposed in the housing; and
a cell support member at least configured to support the cell assembly;
wherein the cell assembly comprises a plurality of cells which are sheet-shaped and tabs disposed at each of two ends of the cell assembly and protruding from the plurality of cells, the plurality of cells are stacked, each of the plurality of cells comprises an encapsulation member configured to encapsulate the each of the plurality of cells, the cell support member is disposed at the two ends of the cell assembly, at least part of the cell support member encapsulates the tabs, the cell assembly is configured to be capable of discharging at a rate higher than or equal to 5 C at an ambient temperature T, $-22°\,C. \leq T \leq -15°\,C.$, 5 C represents a current intensity when a battery pack completely discharges for $\frac{1}{5}$ hours, and the cell assembly has a gravimetric energy density higher than or equal to 300 wh/kg.

* * * * *

UNITED STATES PATENT AND TRADEMARK OFFICE
CERTIFICATE OF CORRECTION

| | | |
|---|---|---|
| PATENT NO. | : 12,170,386 B2 | Page 1 of 1 |
| APPLICATION NO. | : 17/551597 | |
| DATED | : December 17, 2024 | |
| INVENTOR(S) | : Zhijun Dong et al. | |

It is certified that error appears in the above-identified patent and that said Letters Patent is hereby corrected as shown below:

On the Title Page

Please add:
Item [30] Foreign Application Priority Data
September 3, 2019 (CN) ................ 201910829581
June 20, 2019 (CN) ....................... 201910534991

Signed and Sealed this
Fourth Day of March, 2025

Coke Morgan Stewart
*Acting Director of the United States Patent and Trademark Office*